(12) United States Patent
Pacala

(10) Patent No.: US 12,061,261 B2
(45) Date of Patent: *Aug. 13, 2024

(54) AUGMENTING PANORAMIC LIDAR RESULTS WITH COLOR

(71) Applicant: Ouster, Inc., San Francisco, CA (US)

(72) Inventor: Angus Pacala, San Francisco, CA (US)

(73) Assignee: Ouster, Inc., San Francisco, CA (US)

( * ) Notice: Subject to any disclaimer, the term of this patent is extended or adjusted under 35 U.S.C. 154(b) by 778 days.

This patent is subject to a terminal disclaimer.

(21) Appl. No.: 17/067,411

(22) Filed: Oct. 9, 2020

(65) Prior Publication Data
US 2021/0041570 A1  Feb. 11, 2021

Related U.S. Application Data

(63) Continuation of application No. 15/980,509, filed on May 15, 2018, now Pat. No. 10,809,380.
(Continued)

(51) Int. Cl.
*G01S 17/00* (2020.01)
*G01S 7/481* (2006.01)
(Continued)

(52) U.S. Cl.
CPC ............ *G01S 17/42* (2013.01); *G01S 7/4813* (2013.01); *G01S 7/497* (2013.01); *G01S 7/51* (2013.01);
(Continued)

(58) Field of Classification Search
USPC .............................................. 356/4.01, 5.01
See application file for complete search history.

(56) References Cited

U.S. PATENT DOCUMENTS

| 7,590,262 B2 | 9/2009 | Fujimura et al. |
| 7,701,558 B2 | 4/2010 | Walsh et al. |

(Continued)

FOREIGN PATENT DOCUMENTS

| CN | 1795478 A | 6/2006 |
| CN | 107576960 | 1/2018 |

(Continued)

OTHER PUBLICATIONS

EP18802367.5, "Extended European Search Report", dated Dec. 17, 2020, 6 pages.
(Continued)

*Primary Examiner* — James R Hulka
(74) *Attorney, Agent, or Firm* — Kilpatrick Townsend & Stockton LLP

(57) ABSTRACT

Methods and systems can augment 360 degree panoramic LIDAR results (e.g., from a spinning LIDAR system) with color obtained from color cameras. A color-pixel-lookup table can specify the correspondence between LIDAR pixels (depth/ranging pixels) and color pixels, which may be done at different viewing object distances. The operation of the color cameras can be triggered by the angular positions of the LIDAR system. For example, a color image of a particular camera can be captured when the LIDAR system is at a particular angular position, which can be predetermined based on properties of the cameras (e.g., shutter speed). Alternatively or in addition, a common internal clock can be used to assign timestamps to LIDAR and color pixels as they are captured. The corresponding color pixel(s), e.g., as determined using a color-pixel-lookup table, with the closest timestamp can be used for colorization.

18 Claims, 12 Drawing Sheets

Related U.S. Application Data

(60) Provisional application No. 62/506,460, filed on May 15, 2017.

(51) Int. Cl.

| | | |
|---|---|---|
| *G01S 7/497* | (2006.01) | |
| *G01S 7/51* | (2006.01) | |
| *G01S 17/42* | (2006.01) | |
| *G01S 17/86* | (2020.01) | |
| *G01S 17/89* | (2020.01) | |
| *G01S 17/931* | (2020.01) | |
| *G06T 7/50* | (2017.01) | |
| *H04N 23/10* | (2023.01) | |
| *H04N 23/73* | (2023.01) | |
| *H04N 23/80* | (2023.01) | |
| *H04N 23/698* | (2023.01) | |

(52) U.S. Cl.
CPC .............. *G01S 17/86* (2020.01); *G01S 17/89* (2013.01); *G01S 17/931* (2020.01); *G06T 7/50* (2017.01); *H04N 23/10* (2023.01); *H04N 23/73* (2023.01); *H04N 23/80* (2023.01); *H04N 23/698* (2023.01)

(56) References Cited

U.S. PATENT DOCUMENTS

| | | | |
|---|---|---|---|
| 8,013,983 B2 | 9/2011 | Lin et al. | |
| 8,374,405 B2 | 2/2013 | Lee et al. | |
| 8,675,181 B2 | 3/2014 | Hall | |
| 8,774,950 B2 | 7/2014 | Kelly et al. | |
| 9,041,915 B2 | 5/2015 | Earhart et al. | |
| 9,098,754 B1 | 8/2015 | Stout et al. | |
| 9,111,444 B2 | 8/2015 | Kaganovich | |
| 9,164,511 B1 | 10/2015 | Ferguson et al. | |
| 9,369,689 B1 | 6/2016 | Tran et al. | |
| 9,489,601 B2 | 11/2016 | Fairfield et al. | |
| 9,684,673 B2 * | 6/2017 | Beckett | G06F 16/29 |
| 10,445,928 B2 * | 10/2019 | Nehmadi | G06T 3/4007 |
| 10,523,880 B2 * | 12/2019 | Gassend | H04N 23/698 |
| 10,809,380 B2 | 10/2020 | Pacala | |
| 11,025,885 B2 * | 6/2021 | Pacala | G01S 7/4815 |
| 11,178,381 B2 * | 11/2021 | Pacala | G01S 7/4816 |
| 11,190,750 B2 * | 11/2021 | Pacala | H04N 13/218 |
| 11,196,979 B2 * | 12/2021 | Pacala | H04N 13/218 |
| 11,202,056 B2 * | 12/2021 | Pacala | H04N 13/218 |
| 11,501,123 B2 * | 11/2022 | Zhang | G06F 18/213 |
| 11,627,298 B2 * | 4/2023 | Pacala | G02B 5/005 250/350 |
| 11,695,911 B2 * | 7/2023 | Pacala | H04N 13/25 348/48 |
| 2007/0247457 A1 | 10/2007 | Gustafsson et al. | |
| 2008/0112610 A1 | 5/2008 | Israelsen et al. | |
| 2008/0212836 A1 * | 9/2008 | Fujimura | G06V 40/107 382/103 |
| 2010/0121577 A1 | 5/2010 | Zhang et al. | |
| 2010/0157280 A1 | 6/2010 | Kusevic et al. | |
| 2010/0302528 A1 | 12/2010 | Hall | |
| 2012/0044476 A1 | 2/2012 | Earhart et al. | |
| 2013/0141549 A1 | 6/2013 | Beers et al. | |
| 2013/0162629 A1 | 6/2013 | Huang et al. | |
| 2013/0201291 A1 | 8/2013 | Liu et al. | |
| 2014/0347486 A1 | 11/2014 | Okouneva | |
| 2015/0002636 A1 | 1/2015 | Brown | |
| 2015/0138310 A1 | 5/2015 | Fan et al. | |
| 2015/0341552 A1 | 11/2015 | Chen et al. | |
| 2015/0379371 A1 | 12/2015 | Yoon et al. | |
| 2015/0379766 A1 | 12/2015 | Newman et al. | |
| 2016/0044240 A1 | 2/2016 | Beers et al. | |
| 2016/0048689 A1 | 2/2016 | Wiener | |
| 2016/0065949 A1 | 3/2016 | Lakshminarayan et al. | |
| 2016/0097858 A1 | 4/2016 | Mundhenk et al. | |
| 2016/0161600 A1 | 6/2016 | Eldada et al. | |
| 2016/0249039 A1 | 8/2016 | Tran et al. | |
| 2016/0277786 A1 * | 9/2016 | Rondinelli | H04N 5/76 |
| 2016/0300375 A1 * | 10/2016 | Beckett | G06F 16/51 |
| 2016/0328619 A1 | 11/2016 | Yi et al. | |
| 2017/0039436 A1 | 2/2017 | Chen et al. | |
| 2017/0146641 A1 | 5/2017 | Walsh et al. | |
| 2017/0171465 A1 | 6/2017 | Chen | |
| 2017/0278218 A1 | 9/2017 | Carpenter et al. | |
| 2018/0136314 A1 | 5/2018 | Taylor et al. | |
| 2018/0139431 A1 | 5/2018 | Simek et al. | |
| 2018/0152691 A1 * | 5/2018 | Pacala | G01S 7/4816 |
| 2018/0232947 A1 * | 8/2018 | Nehmadi | G01S 7/295 |
| 2018/0329066 A1 * | 11/2018 | Pacala | G01S 17/931 |
| 2018/0359460 A1 * | 12/2018 | Pacala | G01S 7/4815 |
| 2019/0098233 A1 * | 3/2019 | Gassend | H04N 25/40 |
| 2020/0036959 A1 * | 1/2020 | Pacala | G02B 5/208 |
| 2021/0264223 A1 * | 8/2021 | Zhang | G06F 18/25 |
| 2021/0274148 A1 * | 9/2021 | Pacala | G02B 5/208 |
| 2021/0306609 A1 * | 9/2021 | Pacala | H04N 13/218 |
| 2021/0337178 A1 * | 10/2021 | Pacala | G01S 17/10 |
| 2022/0201267 A1 * | 6/2022 | Pacala | G02B 27/46 |

FOREIGN PATENT DOCUMENTS

| | | |
|---|---|---|
| JP | 2004265396 A | 9/2004 |
| JP | 2008204406 A | 9/2008 |
| JP | 2012173114 A | 9/2012 |

OTHER PUBLICATIONS

Application No. JP2019-563212, Office Action, dated Feb. 9, 2022, 10 pages.
JP2019-563212, "Notice of Decision to Grant", dated Oct. 3, 2022, 4 pages.
"Vehicle Panoramic Image And Laser Point Cloud Fusion To Generate Color Point Cloud Scheme", Science of Surveying and Mapping, vol. 40, No. 9, Sep. 2015, pp. 111-114.
CN201880039931.9, "Office Action", dated Jan. 19, 2023, 11 pages.
CN201880039931.9 , "Notice of Decision to Grant", dated Jun. 29, 2023, 7 pages.
Jung et al., "3D Vision Based Obstacle Detection by Euclidean Clustering of Point Cloud", Regular Academic Conference of the Korean Society of Survey, Geodesy, Photogrammetry, and Cartography 2017, Apr. 2017, pp. 222-223.
KR10-2019-7035085, "Office Action", dated Aug. 18, 2023, 28 pages.
Park et al., "Applicability Estimation of Mobile Mapping System for Eefficient Construction of Road Geospatial Information", Journal of The Korean Cadastre Information Association, vol. 16, No. 2, Aug. 2014, pp. 185-192.
Rusu et al., "3D is here: Point Cloud Library (PCL)", 2011 IEEE International Conference on Robotics and Automation, Aug. 18, 2011, 4 pages.
JP2022-192760, "Office Action", dated Nov. 27, 2023, 7 pages.
EP18802367.2, "Intention to Grant" dated Nov. 2, 2023, 5 pages.
Bileschi , "Fully Automatic Calibration Of LIDAR And Video Streams From A Vehicle", 2009 Institute of Electrical and Electronics Engineers 12th International Conference on Computer Vision Workshops(ICCV Workshops), Nov. 2009, 8 pages.
KR10-2019-7035085, "Office Action", Feb. 19, 2024, 27 pages.
"Total Sight 3D Imaging Lidar", Ball Aerospace, vol. D1650, 2016, 2 pages.
U.S. Appl. No. 15/980,509, "Final Office Action", Dec. 12, 2019, 22 pages.
U.S. Appl. No. 15/980,509, "Non-Final Office Action", Aug. 8, 2019, 19 pages.
U.S. Appl. No. 15/980,509, "Notice of Allowance", Jun. 11, 2020, 8 pages.
Axel et al., "Fusion of Terrestrial LiDAR Point Clouds with Color Imagery", May 16, 2013, 16 pages.
Nelson, "Real-Time, Full Motion 3D Color LIDAR Imagery", LiDAR Magazine, vol. 3, No. 3, 2013, 3 pages.
PCT/US2018/032811, "International Preliminary Report on Patentability", Nov. 28, 2019, 7 pages.

(56) References Cited

OTHER PUBLICATIONS

PCT/US2018/032811, "International Search Report and Written Opinion", Aug. 3, 2018, 8 pages.
Wang et al., "A Mobile System for 3D Indoor Mapping Using LiDar and Panoramic Camera", IPSJ SIG Technical Report, vol. 46, No. 1, May 11, 2015, pp. 1-7.
Yunsu et al., "Sensor Fusion of Cameras and a Laser for City-Scale 3D Reconstruction", Sensors, vol. 14, No. 11, Nov. 4, 2014, pp. 20882-20909.
EP18802367.5, "Intention to Grant", Apr. 23, 2024, 6 pages.
Castorena et al., "Autocalibration of LIDAR and Optical Cameras via Edge Alignment", Institute of Electrical and Electronics Engineers, International Conference on Acoustics, Speech, and Signal Processing, Mar. 2016, 7 pages.
KR10-2019-7035085, "Notice of Decision to Grant", May 27, 2024, 6 pages.

\* cited by examiner

AUGMENTING PANORAMIC LIDAR RESULTS WITH COLOR

CROSS-REFERENCES TO RELATED APPLICATIONS

This application is a continuation of U.S. patent application Ser. No. 15/980,509 filed May 15, 2018 which claims priority to U.S. Provisional Patent Application No. 62/506,460, filed May 15, 2017, the entire contents of which are hereby incorporated by reference in their entireties for all purposes.

BACKGROUND 360 degree panoramic-view LIDAR systems can create a 3-dimensional map of a volume surrounding the system and therefore can be used in many applications such as vehicle safety and autonomous vehicle control. Most LIDAR systems employ monochromatic laser pulses and can measure both the intensity and time delay of the reflected laser pulse. From the intensity and time delay, the LIDAR system can then compute a LIDAR image comprising an array of LIDAR pixels, each pixel including the range (distance from the LIDAR system) and reflectivity of a detected object in the field around the system. However, such a LIDAR system is inherently blind to the color or spectral qualities of the surrounding volume being mapped. Thus, enhancing the intensity and range information with additional color information would allow the LIDAR system to produce a more informative 3D map that could be deployed more effectively as an aid for object detection & recognition.

LIDAR systems that use multiple lasers of different colors are expensive. Alternatively, attaching one or more external color cameras to various portions of a vehicle requires careful, time-consuming calibration. In addition, having the color cameras and LIDAR as independent modules requires complicated and time-consuming post-processing of the image data in order to successfully merge the ranging data with the color images. Further, parallax errors exist due to the fact that the LIDAR and color cameras cannot occupy the same physical space.

Accordingly, there remains a need for a color-enhanced LIDAR system that is reliable, low-cost, and easy to install.

BRIEF SUMMARY

According to certain embodiments, methods and systems can augment 360 degree panoramic LIDAR results (e.g., from a spinning LIDAR system) with color obtained from color cameras. A color-pixel-lookup table can specify the correspondence between LIDAR pixels (depth/ranging pixels) and color pixels, which may be done at different viewing object distances. The operation of the color cameras can be triggered by the angular positions of the LIDAR system. For example, a color image of a particular camera can be captured when the LIDAR system is at a particular angular position, which can be predetermined based on properties of the cameras (e.g., shutter speed). Triggering the color cameras in this manner can ensure that the camera acquisitions are temporally synchronized with corresponding LIDAR ranging measurements within the same field of view (regardless of the rotation rate of the LIDAR).

Alternatively or in addition, a common internal clock can be used to assign timestamps to LIDAR and color pixels as they are captured. The corresponding color pixel(s), e.g., as determined using a color-pixel-lookup table, with the closest timestamp can be used for colorization.

These and other embodiments of the invention are described in detail below. For example, other embodiments are directed to systems, devices, and computer readable media associated with methods described herein.

A better understanding of the nature and advantages of embodiments of the present invention may be gained with reference to the following detailed description and the accompanying drawings.

DETAILED DESCRIPTION

Figure 1:
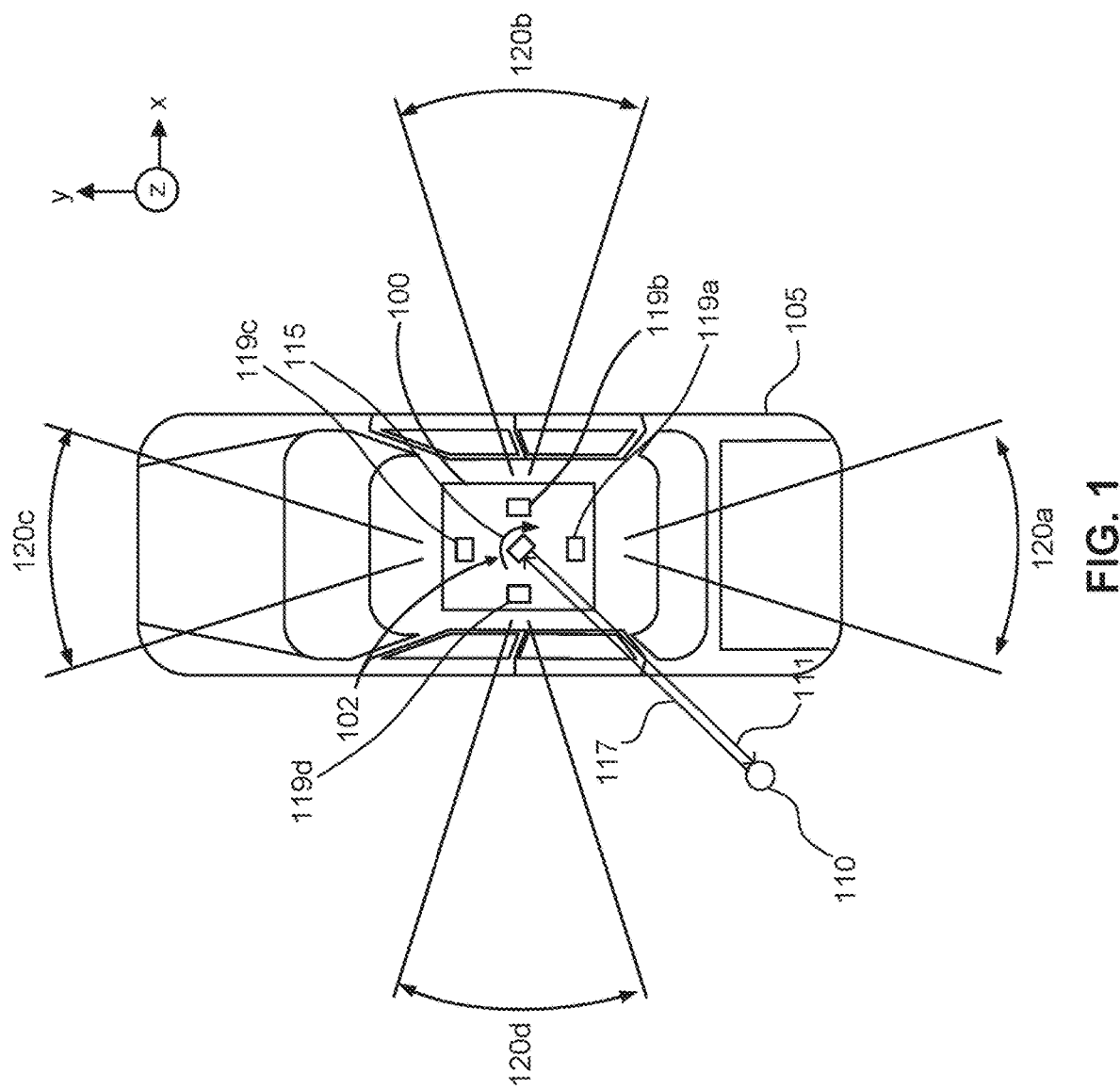
FIG. 1 shows a 360 degree panoramic color LIDAR system (PCLS) in the context of an automotive application, according to some embodiments.

According to certain embodiments, methods and systems disclosed herein relate augmenting 360 degree panoramic LIDAR results with color. Embodiments of a 360 degree panoramic-view, color, spinning, LIDAR system (PCLS) augments its distance and intensity LIDAR results with color-camera information. The cameras and LIDAR system (e.g., emitters and sensors) can be constructed as a mechanically integrated unit that can be calibrated at factory during manufacture.

Part of the calibration can include the determination of a color-pixel-lookup table to determine the correspondence between LIDAR pixels (depth/ranging pixels) and color pixels, which may be done at different viewing object distances. A LIDAR pixel can comprise any information related to LIDAR sensing, e.g., a depth value, a signal strength value, a signal to noise ratio value, and the like. The color-pixel lookup table can specify which color image pixel(s) correspond to each LIDAR pixel for a given ranging measurement. Thus, parallax effects between the LIDAR system and the color cameras can be corrected. The cameras and LIDAR system can be rigidly attached to a mechanical support during manufacture such that the pixel-by-pixel mapping between LIDAR pixels and color pixels does not change after the initial assembly, thereby removing the need for additional calibration at the time of installation on the vehicle, although such later calibration is possible.

In some embodiments, a rotary encoder can be used to calibrate the pointing direction (i.e., angular position) of the LIDAR system relative to the color cameras, allowing a direct way for the system to determine when each of the color cameras needs to be triggered as the LIDAR system rotates. Triggering the color cameras in this manner ensures that the camera acquisitions are temporally synchronized with corresponding LIDAR ranging measurements within the same field of view (regardless of the rotation rate of the LIDAR). Such a system minimizes temporal changes between the LIDAR and color acquisitions (e.g., caused by movement of cars, pedestrians, etc.), thereby enabling the two types of pixels to more closely correspond to the point on an object. In other embodiments, independent LIDAR and color camera systems can perform alignment using time stamps to identify color pixel(s) of a camera image that is closest in time to a LIDAR pixel of the LIDAR image. The triggering of the color cameras based on the position of the LIDAR can provide improved temporal synchronization.

Because the color cameras and LIDAR system can be integrated into a single mechanical unit, as opposed to being separate modules, the system can be calibrated at the factory and installed on a vehicle without further calibration at the time of installation. Likewise, during the factory calibration, the pointing direction of the LIDAR relative to the color cameras can also be calibrated using the output of a rotary encoder that is integrated into the rotating LIDAR. This rotational calibration allows the system to determine when the LIDAR is pointing in a direction that is within a field of view of one of the cameras, and when to trigger a particular camera acquisition. Thus, after calibration at the factory, for every frame of LIDAR data (obtained during one 360 degree rotation of the LIDAR), the alignment between the various color images and the LIDAR point cloud can be fixed and repeatable.

The acquisition timing between the LIDAR and color cameras (e.g., time between trigger and capturing color pixels) can also be set at the factory and need not be recalibrated at the time of installation. The overall rigidity and stability of the system allows for the use of the pixel lookup table to quickly associate one or more color pixels of a specified color image with every LIDAR pixel. The lookup table can be used in real-time as a result of a predetermined correlation between a triggered color image and LIDAR pixels acquired at particular angular positions during a current rotation cycle. The use of a lookup table in real-time can besimpler than arrangements that rely on separate acquisitions of color and LIDAR data that are later co-aligned during a post-processing step using time stamps and/or geographical data.

Because a color pixel can be quickly identified for every acquired LIDAR pixel, the PCLS can quickly transmit a full color enhanced pixel (range, intensity, R, G, B) to downstream processing elements for use in three dimensional image reconstruction or for use in safety systems without the need for complex post-processing to co-align the color and LIDAR images, e.g., based on time stamps. This reduction in processing time can be advantageous if the system is employed within a broader safety system, such as an advanced driver assistance system (ADAS) or autonomous driving system.

I. Automotive Panoramic Color Lidar System

FIG. 1 shows a 360 degree panoramic color LIDAR system (PCLS) 100 in the context of an automotive application, according to some embodiments. The automotive application for the PCLS is chosen here merely for the sake of illustration and the sensors described herein may be employed in other types of vehicles, e.g., boats, aircraft, trains, etc., as well as in a variety of other applications where LIDAR images are useful, such as medical imaging, geodesy, geomatics, archaeology, geography, geology, geomorphology, seismology, forestry, atmospheric physics, laser guidance, airborne laser swath mapping (ALSM), and laser altimetry. According to some embodiments, the PCLS 100 can be mounted on the roof of a vehicle 105 as shown in FIG. 1.

In some embodiments, PCLS 100 includes a scanning LIDAR system 102 rotationally coupled to a color camera assembly that includes an array of color cameras 119a-119d. The scanning LIDAR system 102 shown in FIG. 1 can employ a rotating architecture, where the pointing direction (i.e., angular position) of LIDAR system 102 can be scanned across all or a portion of a 360 degree field of view around the vehicle 105. In some embodiments, pulsed output beam(s) 111 can be scanned over the surrounding environment, as shown. Objects within the surrounding volume will then reflect portions 117 of reflected light of the pulsed output beam(s) 111 and these reflected portions 117 then travel back to the LIDAR system and can be detected by detector circuitry. Based on a time difference between the emission and detection, computations can determine the distance of an object from the LIDAR system (also referred to herein as "range") at a point 110 in the environment surrounding the vehicle. While only a single point 110 is shown in FIG. 1 at the given angular direction, the LIDAR system 102 may include an array of emitters (e.g., distributed up and down the z-axis) for measuring depth values at a corresponding array of points for any given orientation of the output beam(s) 111. Two dimensional (2D) arrays of emitters can also be used.

The scanning LIDAR system 102 can be mechanically rotated about the z-axis (as indicated by clockwise rotation direction 115) to capture a LIDAR image of the full field of view that is 360 degrees around the vehicle 105. In some embodiments, the rotation can be implemented by mechanical means, e.g., by mounting the scanning LIDAR system 102 to a rotating column or platform that can be driven by an electric motor. In other embodiments, the rotation can be implemented through other mechanical means such as through the use of galvanometers. Chip-based steering techniques can also be employed, e.g., by using microchips that employ one or more MEMS based reflectors, e.g., such as a digital micromirror (DMD) device, a digital light processing (DLP) device, and the like. In some embodiments, the scanning can be effectuated through non-mechanical means, e.g., by using electronic signals to steer one or more optical phased arrays.

As shown, the array of color camera includes color camera 119a-119d. Each of the cameras 119a-119d can capture a 2D color image within respective angular fields of view 120a-120d that are portions of the full 360 field of view of the LIDAR system. In some embodiments, each color camera 119a-119d can use ambient light reflections to determine the color of pixels within its field-of-view 120a-120d, respectively. As described in more detail below, color information captured from the cameras can be used to enrich the depth data captured by the scanning LIDAR system thereby providing both depth (distance) and color information on a pixel-by-pixel basis.

II. Geometric Arrangement

Figure 2A:
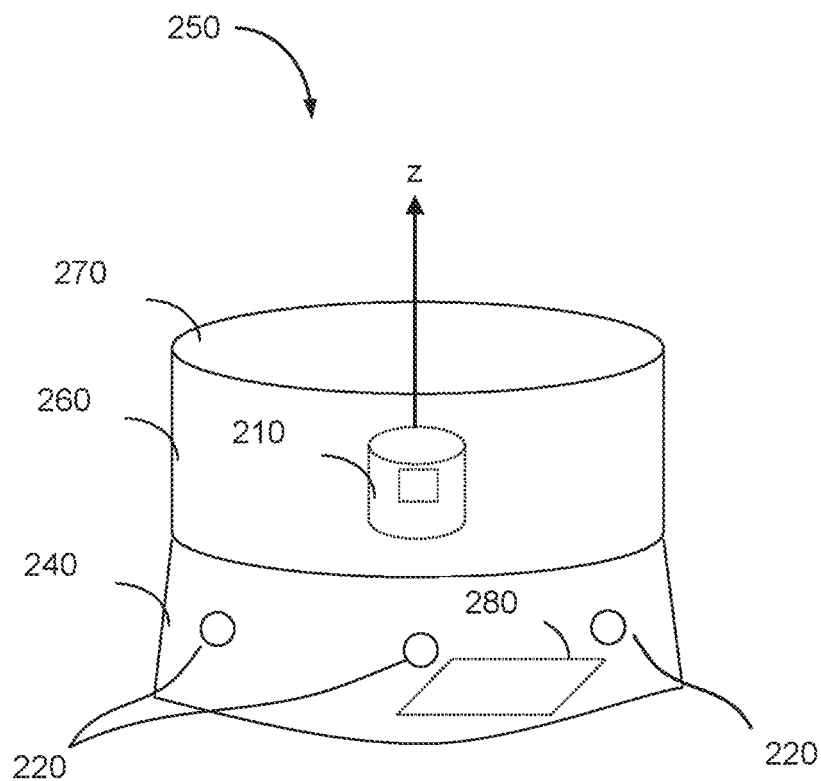
FIGS. 2A-2B show a PCLS geometry according to certain embodiments.

FIG. 2A is a perspective-view showing a PCLS 250 according to certain embodiments, like PCLS 100 described above in reference to FIG. 1. The PCLS 250 includes an enclosure formed from an optically transparent window 260 and a lid 270 to provide protection for a scanning LIDAR system 210. In some embodiments, a system controller 280 and a color camera array including cameras 220 can also reside within the housing. The array of color cameras can be positioned around the periphery of the base 240 and the base itself can include an array of apertures such that each camera has a clear optical path out of the base 240. In some embodiments, the apertures can be empty through-holes or can include one or more optical elements to assist with each color camera's imaging.

In some embodiments, the color cameras need not be affixed directly to the base 240, but can be mounted to some internal structure or can be mounted to one or more circuit boards that are housed within the enclosure. In some embodiments, cameras 220 are rigidly mounted (directly or indirectly) to the base 240 of the enclosure such that the scanning LIDAR system 210 can rotate relative to the cameras, i.e., cameras 220 are stationary relative to the housing while the scanning LIDAR system 210 can rotate within the enclosure, e.g., about the z-axis.

Figure 2B:
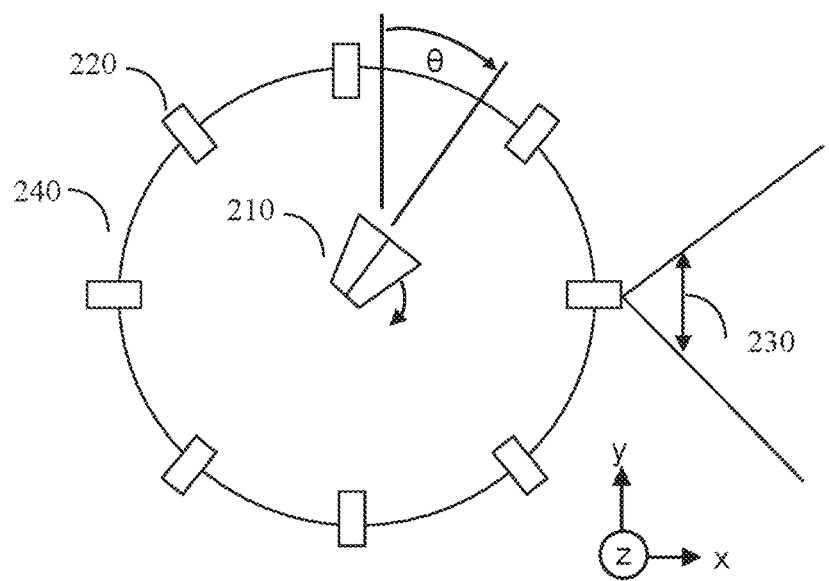

FIG. 2B illustrates a top view of a PCLS, as would be seen looking down along the z-axis at a PCLS that has the enclosure removed, further detailing the geometric arrangement of the cameras 220 relative to the scanning LIDAR system 210. As before, scanning LIDAR system 210 transmits light pulses and analyzes their reflections to produce distance and intensity values in the form of a LIDAR image.

At any given point in time, the scanning LIDAR system 210 can be pointing in a specific angular direction θ (relative to a fixed reference position, e.g., located at y-axis) and can therefore generate distance and intensity values for objects in the field in that specific direction. As the LIDAR system 210 spins about the z-axis, it can generate distance and intensity values for multiple directions it spins through, e.g., as defined by the time/rate for performing a measurement. Thus, LIDAR system 210 can provide a 360 degree panoramic-view of the volume surrounding it.

In one embodiment, the PCLS can include 8 color cameras 220 arranged symmetrically around the scanning LIDAR system 210. Other embodiments may contain a different number of cameras and non-symmetrical arrangements without departing from the scope of the present disclosure. Each color camera 220 can capture a 2D image within its own angular field-of-view 230 (which is a portion of the full 360 degree field of view of the scanning LIDAR system 210). As shown, the field-of-view 230 of each of the eight color cameras 220 can cover an angle of 45 degrees.

The shutter of each of the color cameras can be synchronized with the rotation of the scanning LIDAR system 210 such that PCLS 250 can trigger an acquisition of a color camera when the LIDAR system 210 is oriented within the field of view of the corresponding camera, e.g., when LIDAR system 210 is in the middle of the field of view. LIDAR data (e.g., pixels) acquired within the field of view of the triggered camera can be combined with the color data of the triggered image. PCLS 250 may combine just acquired LIDAR data (e.g., within the first half of the field of view) with the color image data. PCLS 250 may acquire the color camera data before the LIDAR system 210 has completed all ranging measurements within the field of view (e.g., corresponding to the triggered image). In such a case, PCLS 250 can read color image data from that specific color camera 220 and combine it with the now acquired LIDAR data as the LIDAR sweeps through the rest of the camera's field of view.

In one embodiment the color cameras 220 can be low-cost CMOS sensors, which typically have a rolling shutter. Rolling shutter sensors generate data for one or more columns of pixels at a time. Cameras with global shutters can also be used. In either a case, PCLS 250 can arrange the color camera's 220 orientation and LIDAR system's 210 spin direction so that they acquire pixel data in the same circular direction. PCLS 250 can also control the color camera shutter so acquiring of color pixels is synchronized with the capture of LIDAR pixels (i.e., temporally synchronized so that the color pixels of the triggered image align closely in time with the corresponding LIDAR pixels being captured near and at the determined angular position). Other embodiments may use a different type of color camera. For example, the PCLS can use a more expensive CCD camera, which typically captures an entire image at the same time. The color cameras 220 can provide color information in any format including RGB, YUV, and CMYK. In one embodiment base 240 is a mechanical housing of molded plastic, but other embodiments may use metal or other materials.

III. PCLS System Employing Rotary Synchronization

Figure 3:
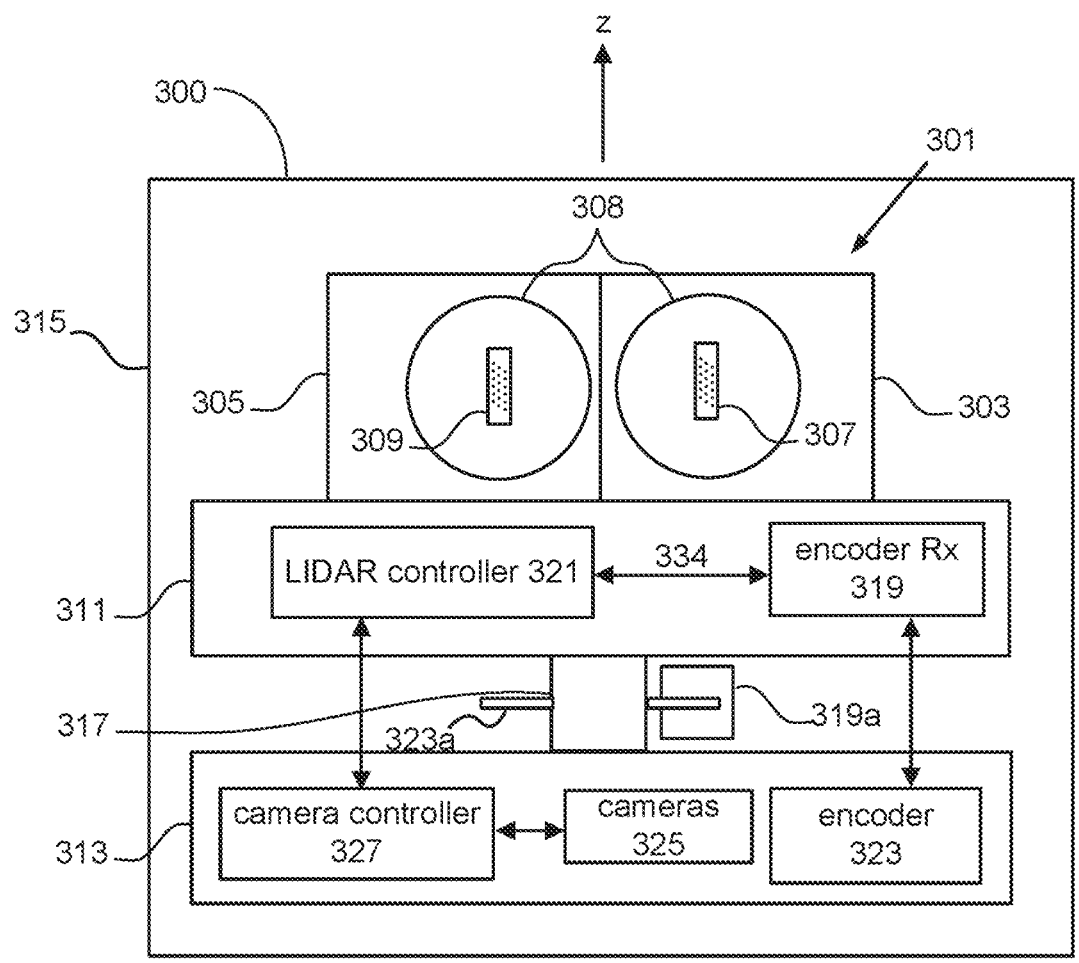
FIG. 3 illustrates a block diagram of a PCLS to further illustrate the concept of rotary synchronization between the spinning LIDAR and the color camera shutters according to certain embodiments.

FIG. 3 illustrates a block diagram of a PCLS 300 to further illustrate the concept of rotary synchronization between the scanning LIDAR system and the color camera shutters according to certain embodiments. Rotary synchronization refers to a process of synchronizing color camera acquisitions with the scanning LIDAR acquisition. In some embodiments, the synchronization can be accomplished without the use of timestamps in post-processing, e.g., by triggering one or more color camera acquisitions based on the angular position of the scanning LIDAR system.

In FIG. 3, a rotating assembly 311 (including, e.g., one or more circuit boards, brackets, or other structural members) is rotationally coupled to a stationary assembly 313 (also called a stationary base) through a rotational coupling 317. Accordingly, the scanning LIDAR system 301 can rotate with the rotating assembly 313 and can scan a full 360 degrees about the z-axis. Stationary assembly 313 can including, e.g., one or more circuit boards, brackets, or other structural members.

The rotation of the scanning LIDAR system 301 can provide a panoramic depth map of the environment around the device, also referred to herein as a "point cloud" and/or a LIDAR image. In some embodiments, the stationary assembly 313 can be coupled to the housing 315, e.g., by way of a mechanical bracket and screws (not shown), such that the stationary assembly 313 is held stationary and does not rotate relative to housing 315.

A rotational coupling 317 can be implemented in a number of different ways in various embodiments. For example, some embodiments can employ a shaft and bearing structure (not shown). In some embodiments, the rotational coupling 317 also includes one or more components for a rotary actuator that not only allows for rotational movement but also drives the rotational movement of the rotating assembly 311. For example, an electric motor module (not shown) can be used, or one or more rotational drive elements can be formed as integral parts of the assemblies themselves. For instance, an arrangement of rotor elements (e.g., permanent magnets) may be directly integrated into a surface of a circuit board of the rotating assembly 311, and an electric motor stator assembly (e.g., including an arrangement of stator elements such as solenoid coils) may be directly integrated into a circuit board of the stationary assembly 313. In such embodiments, where one or more rotary actuation components are integrated into the stationary assembly 313 and/or the rotating assembly 311, a separate module for rotary actuation is no longer needed, thereby increasing reliability, decreasing complexity, and helping to simplify the assembly process.

In some embodiments, a rotary encoder system can track the angular position of the scanning LIDAR system 301 with respect to some fixed reference (e.g., the encoder can measure the angle θ as shown in FIG. 2B). The angular position of the rotating assembly 311 (and thus the LIDAR system 301) can be tracked by a rotary encoder receiver 319. For example, rotary encoder receiver 319 can track the angular position of the rotating assembly 311 by detecting a starting feature and then tracking the passage of the number of features/markings on a ring shaped encoder (e.g., encoder 323), which can be mounted to the stationary assembly 313. Such a starting feature is an example of a fixed reference point on stationary assembly 313.

In other embodiments, the angular position can be tracked by a rotary encoder module fixed somewhere else within housing 315. For example, a rotary encoder receiver 319a can have a slot that receives a ring-shaped rotary encoder 323a. Rotary encoder receiver 319a can determine the angular position of ring-shaped rotary encoder 331 by detecting the passage of one or more features/marks on a ring-shaped rotary encoder 323a. The skilled person will realize that only one encoding mechanism may be used, and two examples are show only for illustrative purposes. While FIG. 3 shows two examples of rotary encoder architectures, any rotary encoder technology can be employed without departing from the scope of the present disclosure.

Regardless of the particular form of the encoder employed, encoder receiver 319 can generate an angular position signal 334 that encodes the angular position of scanning LIDAR system 301 as it rotates over time. Angular position signal 334 can be provided to LIDAR controller 321 for performing the rotary synchronization between the scanning LIDAR acquisitions and the color camera acquisitions. LIDAR controller 321 can be in communication with camera controller 327, which can trigger a specified camera to take an image. Although shown as two separate controllers with each performing separate operations, LIDAR controller 321 and/or camera controller 327 can exist as a single controller that rotates or is fixed.

The controller(s) can determine the current angular position indicated by angular position signal 334. The controller(s) can determine whether the current angular position corresponds to any predetermined values/positions for triggering any of cameras 325. The predetermined positions can be stored in association with an identifier of the corresponding camera. If the current angular positions matches, the controller(s) can send a command signal to the corresponding camera to take an image. The controller(s) can receive angular position signal 334 from the rotary encoders receiver 319 in real time, and thus the system is continuously monitoring the current angular position of the LIDAR system as a function of time, thereby enabling sequential triggering of the cameras at a rate that corresponds to the actual rotation speed occurring.

Because cameras 325 are stationary and mounted at locations that are fixed relative to the stationary assembly, angular position signal 334 indicates the angular position of the LIDAR system relative to the color cameras. As described above, the controller(s) can generate trigger signals that cause camera acquisitions to be taken at the appropriate moment. For example, a color camera acquisition can be triggered when the LIDAR system 301 is currently pointing in a direction that is predetermined and/or specified relative to the triggered camera's field of view. For instance, a camera can be triggered when the LIDAR system 301 is midway through the angular field of view of a camera, slightly before center, slightly after center, or just before or just after the LIDAR enters a given camera's field of view. The process of rotary synchronization described above provides for a LIDAR acquisition that is closely synchronized in time with the color camera acquisitions without time-consuming post-processing for aligning LIDAR and color pixels.

In some embodiments, scanning LIDAR system 301 can include a light transmission module 303 and a light sensing module 305. The light sensing and transmission modules 303 and 305 can include bulk optics 308, e.g., a multi-element lens assembly positioned at the input/output of the sensing and transmission modules, respectively. Light transmission module 303 can further include a focal plane array having a micro-optics array and optional notch filter element (not shown) that is located between the bulk optics 308 and light emitter circuitry 307. In some embodiments, light emitter circuitry 307 includes a chip-scale array of light sources, such as an array of vertical cavity surface emitting lasers (VCSELs) on an Indium Gallium Arsenide (InGAs) substrate. Light sensing module 305 can also include a micro-optics array and notch filter element (not shown) that is located between the bulk optics 308 and light detector circuitry 309. In some embodiments, light detector circuitry 309 can includes a chip-scale array of photon detectors, such as an array of single photon avalanche diodes (SPADS) fabricated in a CMOS technology. Other detector technologies can be employed as well, e.g., avalanche photodiodes, CCD image sensors, CMOS photodiode image sensors, cavity enhanced photodetectors, surface enhanced photodetectors, and the like. Further details (e.g., on micro-optics) can be found in U.S. Patent Publications 2017/0289524 and 2017-0219426, the contents of which are incorporated by reference in their entirety.

LIDAR controller 321 and/or the camera controller 327 can include one or more processors and memory (not shown). For example, the system controllers can include field programmable gate arrays (FPGAs) and/or one or more application specific integrated circuits (ASICs) that are tailored to provide certain LIDAR and/or camera control functionality. Scanning LIDAR system 301 can be hard wired to the rotating assembly 311 via a multi-pin electrical connector or may be wirelessly connected, e.g., through one or more communication channels that employ optical, inductive, RF connections, and the like, to the stationary assembly 313. Color cameras 325 can be mounted directly to a circuit board of the stationary assembly 313. Stationary assembly 313 can wirelessly transmit power to the rotating assembly 311 to, e.g., power the scanning LIDAR system 301 and any other associated circuitry, e.g., ASICS, FPGAs, communications circuits and the like. In addition, optical, inductive, and/or capacitive communications channels can connect the stationary assembly 313 to rotating assembly 311 thereby allowing for scanning LIDAR system 301 to be controlled via contactless data transfer from the base circuit board assembly.

In some embodiments, the hardware and software/firmware for performing one or more LIDAR-specific operations (e.g., photon time series accumulation followed by peak detection and ranging data computation and output) can be incorporated into the circuitry of scanning LIDAR system 301 and/or LIDAR controller 321. For example, light detector circuitry 309 may also include an ASIC that is integrated onto the same substrate as the array of SPADs. In such a situation, scanning LIDAR system 301 is modular in the sense that a reprogramming (reconfiguring) of the software/firmware can allow the scanning LIDAR system 301 to operate as part of a rotating LIDAR system or as a standalone solid state LIDAR system. Circuitry can be employed (e.g., MEMS, DMD, optical phased arrays, and the like) that will also allow for beam steering without the need for a mechanical rotational actuator. Accordingly, the modular design of the system disclosed herein results in a highly adaptable system that can fit user needs without expensive and time consuming redesign of the overall hardware and mechanical architecture.

IV. Color Image Acquisition Based on Angular Position of Lidar

Figure 4:
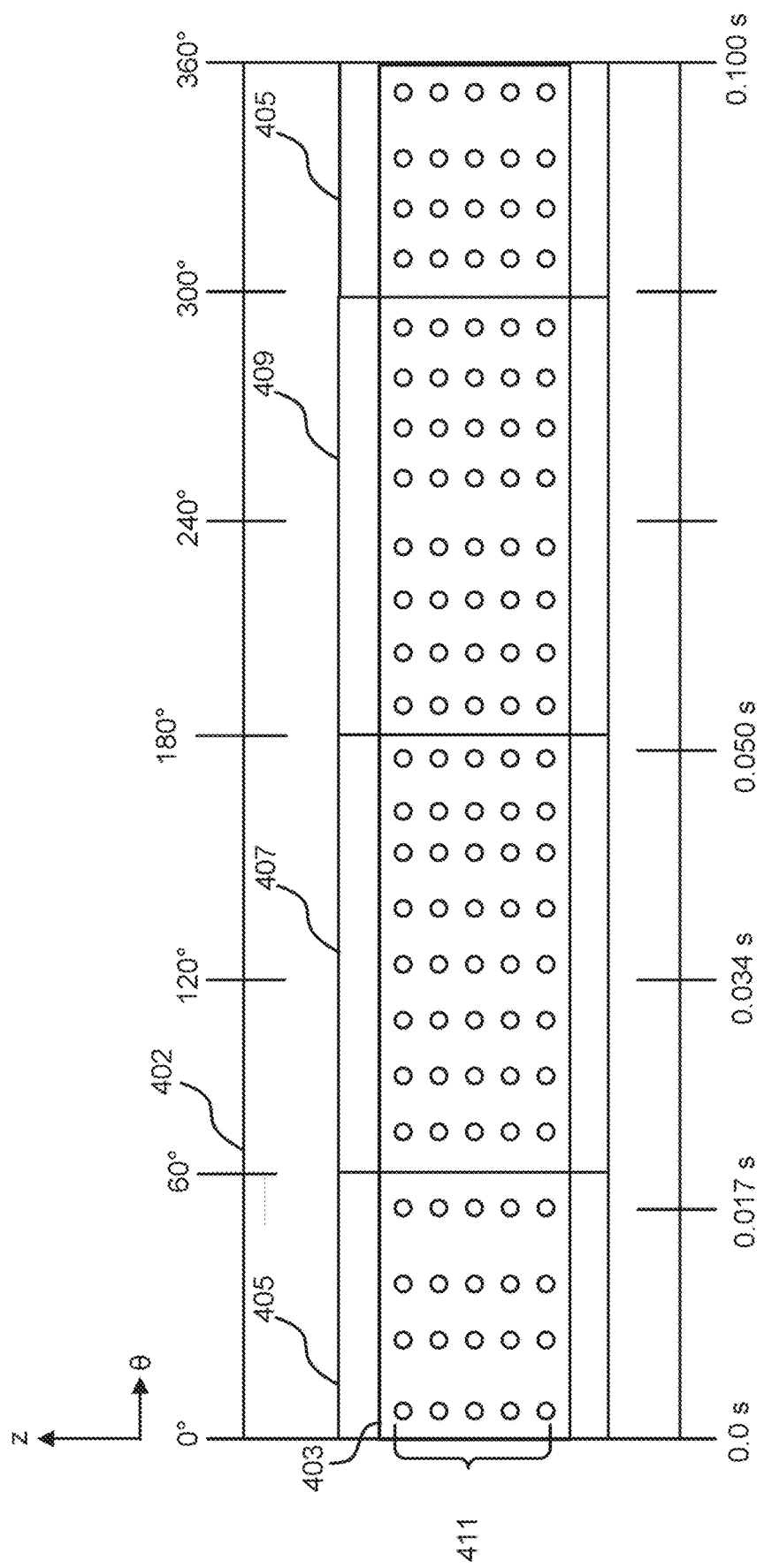
FIG. 4 illustrates a LIDAR field of view overlapped with a set of color camera fields of view for the purposes of illustrating a camera synchronization process according to certain embodiments.

FIG. 4 illustrates a panoramic LIDAR image 403 that has been aligned with a set of color camera fields of view for the purposes of illustrating the rotary synchronization process according to certain embodiments. FIG. 4 illustrates how a system controller can trigger a series of acquisitions of color images 405, 407, and 409 from a set of color cameras of the PCLS system based on the angular position signal generated by the rotary encoder according to certain embodiments. More specifically, FIG. 4 shows a full 360 degree panoramic LIDAR image 403 overlapped with color images 405, 407, and 409 acquired for a PCLS having three color cameras disposed circumferentially about the base in a manner similar to that shown in FIG. 2B. In this example, each color camera possesses an approximately 120 degree field of view.

The top horizontal axis 402 of FIG. 4 delineates the orientation angle of the scanning LIDAR system and the bottom horizontal axis 404 delineates elapsed time, assuming the angular velocity of the scanning LIDAR is a uniform angular velocity that results in a 10 Hz rotation rate. Furthermore, for the purposes of this example, the first camera (corresponding to color image 405) is pointed with the normal to its imaging plane pointing in the 0 degree direction such that its angular field of view is centered on the 0 degree point; the second camera (corresponding to color image 407) is pointed with the normal to its imaging plane pointing in the 120 degree direction such that its angular field of view is centered on the 120 degree point; and the third camera (corresponding to color image 409) is pointed with the normal to its imaging plane pointing in the 240 degree direction such that its angular field of view is centered on the 240 degree point.

For the sake of simplicity, it is assumed that the scanning LIDAR system can acquire a group 411 of 5 LIDAR pixels at any given angle with those 5 LIDAR pixels being vertically distributed in the z-direction amongst 5 non-overlapping fields of view in the field ahead of the LIDAR system. Also assumed is that the scanning LIDAR system can acquire 24 groups of 5 LIDAR pixels for every rotation of the scanning LIDAR system. Thus, every frame of LIDAR data includes 24*5=120 LIDAR pixels that are distributed about the 360 field of view around of the system.

For certain portions of the rotation, certain groups of LIDAR pixels can be seen to overlap with certain fields of view of different cameras. To maximize temporal synchronization between the LIDAR pixels and color camera pixels, it is beneficial to acquire a color camera image at a time when the LIDAR system is actively scanning through the camera's field of view. This is advantageous because it minimizes the time between LIDAR and color camera acquisitions, thereby minimizing the chance that something in the field has dynamically changed in the time between acquiring a LIDAR pixel and the color pixels. Examples of changes that can occur between the LIDAR and color camera acquisitions include moving vehicles, pedestrians, changing stop light colors, movement or road debris, etc. Taking the case of moving vehicles as an example, poor temporal synchronization of the LIDAR and color camera data could result in a LIDAR image that shows a car in an intersection and a color image of the same field of view without the car.

At the outset, the encoder receiver (e.g., encoder receiver 319 of FIG. 3) can transmit an encoder signal to a controller, e.g., indicating that the scanning LIDAR system is pointing at 0 degrees. Based on this encoder signal, the controller can generate a trigger command sent to a first camera to trigger an acquisition of color image 405. Likewise, the second color camera can be triggered by the system when the encoder signal indicates that the scanning LIDAR system is pointing at 120 degrees. And again, the system can then trigger the third color camera when the encoder signal indicates that the scanning LIDAR system is pointing at 240 degrees. To aid in the physical interpretation of the rotary synchronization process, the actual angles θ, 120, and 240 degrees are used herein. However, as would be appreciated by one of ordinary skill in the art with the benefit of this disclosure, the actual encoder need not measure angular position in degrees and can use any encoding without departing from the scope of the present disclosure.

In some embodiments, the angular positions at which the cameras are triggered can be set based on the nature of the camera acquisition, e.g., whether or not the camera employs a rolling shutter or acquires all image pixels simultaneously (e.g., progressive frame cameras with a global shutter). To ensure that the time of acquisition of a set of LIDAR pixels is closest to the time of acquisition for the corresponding color camera, the controller can take into account the accumulation time (i.e., shutter speed or exposure time) of the camera and accordingly shift the trigger position to an angular position that is advanced or delayed relative to the center of each color camera field of view (i.e., earlier or later in a given rotation cycle of the scanning LIDAR system). Accordingly, in some implementations, the triggering point of the camera frames can be based on the camera exposure set point and LIDAR spin rate to minimize temporal errors between a given camera and the LIDAR data. A goal being can be to have the center of the camera's exposure period align with the LIDAR system being centered in the camera's FOV. Such a procedure can minimize a worst case temporal error between LIDAR and camera data.

Using the second color camera acquisition 407 as an example, the system controller can trigger the color camera at an angular position of the LIDAR that is before 120 degrees or after 120 degrees. Thus, the trigger position for the second camera may occur at 115 degrees, as the time delay for the second camera to actually be triggered can coincide to when the LIDAR system will be pointing at 120 degrees.

Besides illustrating the triggering of camera images, FIG. 4 also illustrates a mapping of different LIDAR pixels to different parts of the color images. A mapping table can be determined during a calibration process that identifies which color pixel(s) correspond to each LIDAR pixel. As the LIDAR is typically lower resolution, more than one color pixel may be assigned to each LIDAR pixel in panoramic LIDAR image 403. When multiple color pixels are assigned to a single LIDAR pixel, an average of the colors can be used.

The set of color pixels of a triggered image and the corresponding LIDAR pixels (e.g., taken within the field of view) can be stored in buffers that are assigned to each other for combining. As examples, a set of color buffers can exist for each color image 405, 407, and 409, with LIDAR data being stored in a corresponding LIDAR buffer based on angular position the LIDAR data was acquired. For instance, a LIDAR buffer corresponding to color image 407 can hold the LIDAR pixels for angular positions 60 to 180 degrees. The storage positions in the buffer can correspond to the angular position, and the storage positions can be used to index the corresponding color pixel(s) in a lookup table.

In another embodiment, the LIDAR pixels of a given LIDAR image can be tagged with a corresponding angular position, where the lookup table can specify which pixel(s) of which color image taken in a current rotation correspond to the angular position. In such an embodiment, two buffers could be used for different LIDAR images (rotations), with the real-time analysis occurring on one buffer while data is being stored in the next buffer.

Because many modern cameras can operate at higher frame rates than the LIDAR sensor (for instance 60 Hz versus 10 Hz), some embodiments can have a camera take two exposures in rapid succession, e.g., each triggered by a LIDAR angular position. The first half of the first exposure image and the second half of the second exposure image can be used to generate a color image. Alternatively, both exposures can be triggered by their own LIDAR angular position. Thus, in one revolution, a color camera can be triggered multiple times, and only a portion of that exposure may be used, e.g., to generate an overall color image for that camera for that revolution. Accordingly, if the camera can support even higher frame rates this can be extended to arbitrary numbers of camera frames taken for each camera's FOV. Such an operation can decrease temporal error (and spatial error by proxy), e.g., by a factor of two or more, depending on the number of exposures taken.

V. Lidar Image-Color Image Pixel Correspondence

As explained above, one or more color pixels can correspond to a LIDAR pixel. A lookup table may be determined via a calibration procedure to identify such mappings.

A. Ideal Pixel Correspondence

Figure 5:
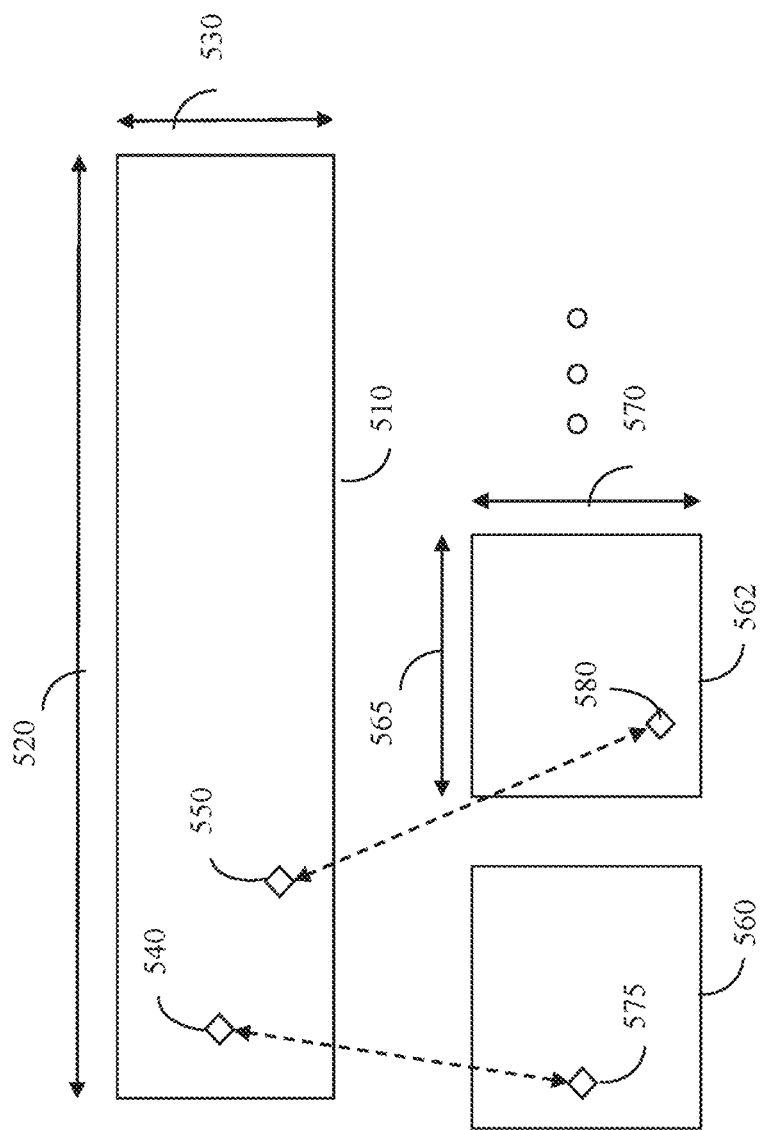
FIG. 5 illustrates, on a pixel-by-pixel level, the correspondence between LIDAR pixels and color pixels.

FIG. 5 illustrates, on a pixel-by-pixel level, the correspondence between LIDAR pixels and color pixels. Advantageously, because in some embodiments the camera acquisitions can be triggered based on the angular position of the LIDAR system (as opposed to using a system clock or the like), the relative position of each color acquisition within the overall LIDAR image is fixed, thereby allowing for a single mapping between LIDAR and color pixels to be determined at the factory via a calibration procedure. This mapping can be stored in system memory of the PCLS and used as a lookup table at times thereafter such that the system knows each color pixel that maps to a corresponding LIDAR pixel.

A LIDAR image 510 is represented as a rectangle and corresponds to the LIDAR data acquired during one revolution (rotation) of the LIDAR system. The LIDAR image 510 contains LIDAR pixel data points (referred to herein as LIDAR pixels) such as LIDAR pixels 540 and 550. These LIDAR pixels can correspond to the non-overlapping fields of view referred to previously in FIG. 4. LIDAR image 510 has LIDAR image width 520 and LIDAR image height 530. For example, the LIDAR image 510 may have a LIDAR image width of 2048 pixels and a LIDAR image height of 64 pixels.

Color images 560 and 562 are also represented as rectangles. During each LIDAR system revolution, the PCLS captures one image from each color camera, with each color camera's acquisition being triggered by the system controller based on the angular position of the LIDAR system. Each color image 560 and 562 has color pixels such as color pixels 575 and 580. Each color image 560 and 562 has color image width 565 and color image height 570. For example, each color image 560 and 562 may have width 640 pixels by height 480 pixels. In this example LIDAR pixel 545 corresponds to color pixel 575 from the first camera image, and LIDAR pixel 550 corresponds to color pixel 580 from the second camera image.

As will be discussed in further detail below, the correspondence between LIDAR and color pixels can be calibrated at the factory in advance of the system being installed on a vehicle in the field, e.g., with recalibration after installation being unnecessary. The LIDAR pixels and the color pixels represent measurements for a specific angular field-of-view (FOV) as discussed above in reference to FIGS. 3-4. The size of the LIDAR pixel's FOV is typically different from the size of the color pixel's FOV. In some embodiments, the correspondence between a LIDAR pixel and color pixels depends on the distance, i.e., range, of the viewed object because of parallax differences between the LIDAR system and the camera at close range.

After LIDAR pixel 540 is acquired at a particular angular position, the lookup table can be accessed using the particular angular position or some proxy of the angular position, e.g., a position in memory that is known to correspond to the particular angular position. For instance, a LIDAR frame can be stored as a two dimensional array with the columns corresponding to each angular position taken during a revolution. The lookup table can be indexed by angular position (or a proxy) and provide color pixel position(s) of a specified camera image, e.g., color image 560. Accordingly, the color-pixel lookup table can be indexed by angular positions around 360 degrees for each revolution. Each entry of the color-pixel lookup table can identify one or more color pixels of a respective color image for a particular angular position and a particular sensor in a pixel array (e.g., one dimensional or two-dimensional pixel array).

The camera images for a given revolution can be stored with an identifier of the corresponding camera. Images for different revolutions can be identified and stored as such. Thus, the lookup table can specify color pixel 575 at position (123,242) of the first camera image of the corresponding revolution.

B. Pixel Correspondence Including Parallax

Figure 6A:
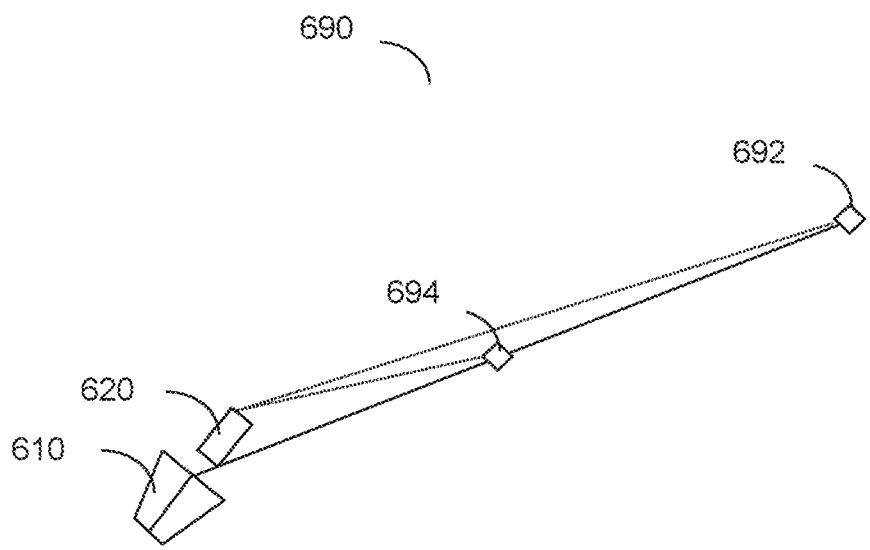
FIGS. 6A-6C illustrate differences between a LIDAR and a color image caused by parallax in accordance with one or more embodiments.
Figure 6B:
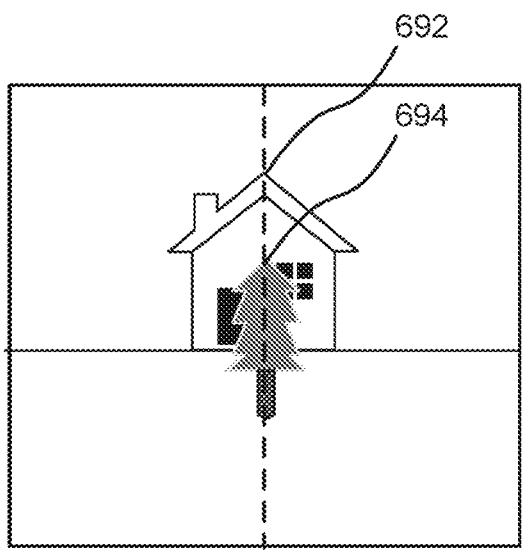
Figure 6C:
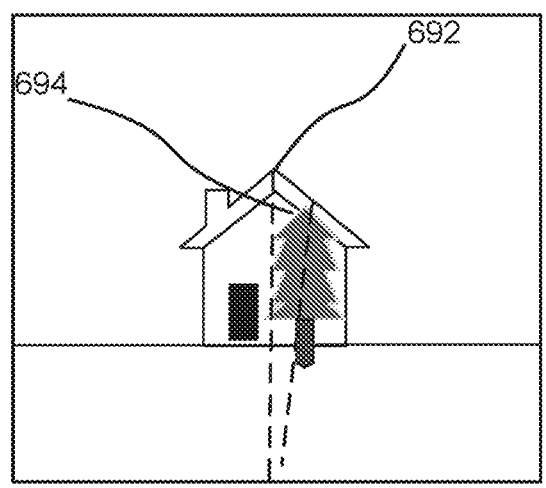

FIG. 6A illustrates differences between a LIDAR and a color image caused by parallax in accordance with one or more embodiments. More specifically FIG. 6A shows a LIDAR system 610 and a color camera 620 both imaging a near point object 694 and far point object 692. To further illustrate the parallax effect, FIG. 6B shows an example of an image that would be acquired from LIDAR system 610, and FIG. 6C shows an example of an image that would be acquired from color camera 620. In FIGS. 6B and 6C, the near point object corresponds to the top of the tree and the far point object corresponds to the top of the house.

In the LIDAR image shown in FIG. 6B, it can be seen that the near point object 694 and the far point object 692 are co-linear with respect to a line that extends from the center of the LIDAR system 610 through the respective objects.

Accordingly, these points in the field correspond to the same LIDAR pixel column. However, as can be seen in FIG. 6A and FIG. 6C, near point object 694 and far point object 692 are not co-linear with respective to the color camera 620. Rather, their corresponding pixels can be found on different pixels columns of the color camera image. Thus, it is possible that the pixel correspondence between the color image and the LIDAR image can be accurate for objects located at one depth but inaccurate for objects located at other depths.

To compensate for this parallax effect, the PCLS can be constructed to minimize parallax effects by locating the color cameras as close as possible to the LIDAR system. In addition, during the factory calibration procedure, multiple pixel mappings can be determined for objects at known depths, and these multiple mappings can be used to determine depth-dependent look-up tables that provide a pixel correspondence for any given depth. For instance, separate lookup tables can be determined for different depths. Thus, a depth measurement of a given LIDAR pixel can be used to identify which lookup table should be used, and then the identified lookup table can be used to identify which color pixel(s) of which camera image are to be used to create the colorized LIDAR pixel.

VI. Pcls System Employing Lookup Table

After a LIDAR pixel is acquired at a given angular position, information relating to the given angular position and location in a sensor array of the LIDAR pixel (e.g., actual angular value, angular encoding position, or memory location in a buffer that is ordered by angular/encoding position) can be used to access a lookup table that provides coordinate(s) of corresponding color pixel(s) assigned to the given angular position and sensor position. Such tables can be configured in various ways, as described herein, e.g., different tables for different cameras, one table for all cameras, and different tables for different depths, which may be defined by a function of depth.

A. System Architecture

Figure 7:
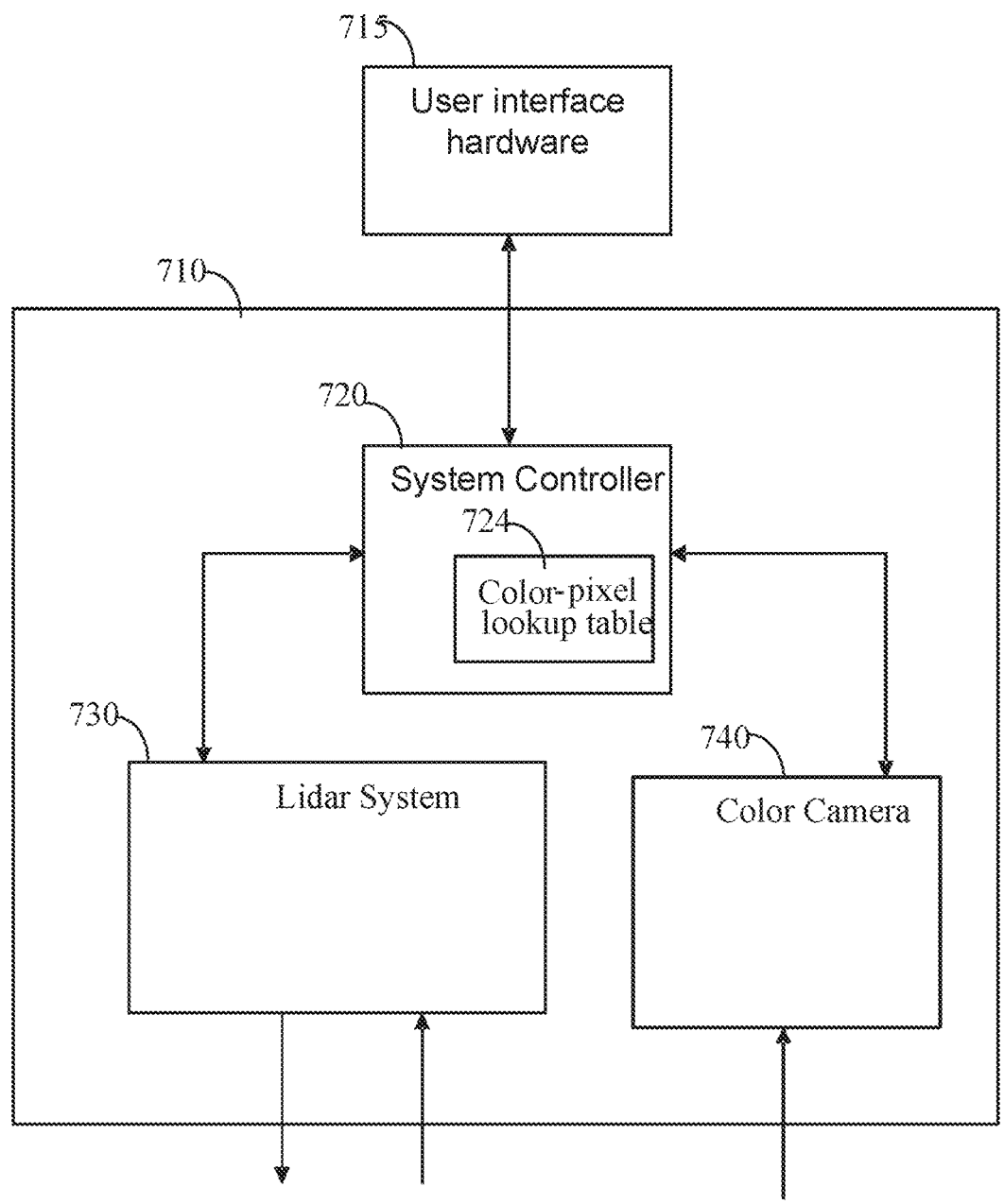
FIG. 7 shows a block diagram of a PCLS 310 to further illustrate the use of a lookup table for depth dependent pixel correspondence according to certain embodiments.

FIG. 7 shows a block diagram of a PCLS 710 to further illustrate the use of a lookup table for depth-dependent pixel correspondence according to certain embodiments. The PCLS 710 can interact with user interface hardware 715. The user interface hardware 715 can take many forms including: a) a computer system with a monitor, keyboard, mouse, CPU and memory; b) a touchscreen in an automobile; and c) a handheld device with a touch-screen. The user interface can allow a user to control the PCLS via one or more user commands, including: a) activate or deactivate the PCLS; b) specify camera brightness, contrast, saturation, hue and other operational parameters; c) setup a color-pixel-lookup table defining the correspondence between LIDAR pixel and color pixels; and d) select the method for displaying results. The user interface can display PCLS results which can include: a) a 3-dimensional color map of detected objects over time; and b) a distance value at a particular time for a particular view for a specific object.

PCLS 710 includes a system controller 720 (e.g., LIDAR controller 321 and/or camera controller 327), a scanning LIDAR system 730, and an array of color cameras 740. System controller 720 can interact with user interface hardware 715 and can control both LIDAR system 730 and array of color cameras 740. System controller 720 can include a communications module configured to send the colored LIDAR pixel data to user interface hardware, e.g., by sending the LIDAR pixel and the at least one corresponding color pixel in a single packet. System controller 720 can be realized in multiple ways including one or more of: (a) using a programmable logic device such an FPGA; (b) as an ASIC or part of an ASIC; (c) using a processor with memory; and (d) some combination of the above.

System controller 720 can control the scanning LIDAR system 730 by sending commands that include start and stop. System controller 720 can read the LIDAR system status to determine when the LIDAR system 730 is pointing at the field-of-view of a different camera and as such can include one or more components of a rotary encoder system, as described herein. System controller 720 can control the color cameras 740 by sending commands that include a) "capture a frame"; and b) adjust camera parameters. System controller 720 can read color image pixel data from the color cameras 740. In one embodiment, the system controller 720 has a wired interface for interacting with the LIDAR system 730 and the color cameras 740.

In some embodiments, the system controller 720 can include a color-pixel-lookup table 724 stored in a non-transitory computer readable medium (not shown). The color-pixel-lookup table 724 defines the correspondence (mapping) between LIDAR pixels and color pixels. Possible color-pixel-lookup table formats include:

(1) A list of closest color pixel coordinates with an entry for each LIDAR pixel in a panoramic LIDAR image. The color pixel coordinates can identify the color image of a particular color camera and a color pixel location(s) within that color camera's image, as may be done with a single table or separate tables for different cameras. Such a format can ignore the distance to the viewed object.

(2) The lookup table can include sub-tables for different sets of distances (e.g., near, middle, and far, or more classifications, such as numerical ranges). Once the particular sub-table is identified based on the measured distance being within a range corresponding to the sub-table, the LIDAR pixel coordinate (e.g., angular position and sensor position in array) can be used to access the sub-table to obtain the color pixel coordinate(s) of the corresponding color image. In this manner, the lookup table can be multidimensional, with pixel ID (e.g., identifier in array of LIDAR sensors), encoder value (e.g., for angular position), and depth value as fields in the table.

(3). A list of property-value entries where each property-value entry (corresponding to a LIDAR pixel coordinate) has a property field and a corresponding value field. Each property field specifies color pixel coordinate(s) corresponding to the LIDAR pixel for different ranges of viewed object distances (e.g., a range of depth values, such as 0 to 1 m; 1 m to 5 m; 5 m to 20 m; and 20 m to 100 m). Each value field defines a formula for computing the corresponding color pixel location(s) based on the property field. The formula can act as a curve fit function that enables a blend of different color pixels to be selected, e.g., different blending weights can be assigned to different color pixels for different depths. Such weights can be assigned based on the measured distance measured for a given LIDAR pixel. For example, the measured distance could be near a boundary between two depth ranges (e.g., 5 m is a boundary for two depth ranges in the examples above), and the blending weights can be about 0.5 for the two sets of color pixel(s) specified for the two depth ranges. The formula for each entry can use the range of viewed object distance to compensate for parallax errors.

Accordingly, the color-pixel lookup table can include depth values for mapping between LIDAR pixels and the color pixels. A system controller can access the color-pixel lookup table using a measured depth value of the corresponding LIDAR pixel, and then associate the color pixel(s) with a LIDAR pixel using one or more color pixels stored for the measured depth value of the corresponding LIDAR pixel. And, the color-pixel lookup table can include a plurality of sub-tables, each associated with a corresponding depth value, and wherein the controller is configured to select one of the plurality of sub-tables for mapping a particular LIDAR pixel having a particular depth value.

Once the color pixel(s) are identified, system controller 720 can combine the color value(s) with value(s) of the LIDAR pixel (e.g., distance and intensity). The portion of system controller 720 that performs such combining can be implement in a base circuit that does not rotate (e.g., stationary assembly 313). Different portion of system controller 720 may be implemented on different circuit boards.

Calibration

The calibration can identify which trigger positions result in aligning the LIDAR fields of view with the camera fields of view (e.g., to their midpoints), and can be done for each vehicle where the system is installed. The color-pixel-lookup table 724 can also be constructed during PCLS manufacturing. To determine which color pixel (or group of color pixels) correspond to which LIDAR pixel, the PCLS can be put into a test chamber that contains objects covered with static test patterns at different known distances. Then images are taken both with the LIDAR system and with each of the color cameras. The images of the various known objects in the two images can be used to correlate one or more color image pixels with a LIDAR pixel for a given depth measurement.

Alternatively the PCLS can be placed in the center of a cylindrical test chamber and the LIDAR and color cameras are triggered to capture images of patterns on the inner surface of the cylinder. For example, the cylinder may be coated with a chessboard pattern with alternating bright and dark squares that have a varying reflectivity such that the features can be detected by both the LIDAR and the color camera. Alternatively, the surface of the cylinder can be coated with QR codes or other objects that can be detected within the images using known object detection techniques. To determine LIDAR-color pixel correspondences for objects at various distances from the PCLS, several different calibration cylinders can be used with each cylinder having a different radius. Once the color-pixel lookup table is completely determined, the information can be stored as a color-pixel-lookup table 724 in a non-transitory computer memory of the PCLS. Color-pixel-lookup table 724 can be stored in various schemes, e.g., separated into sub-tables indexed by various values, e.g., depth, camera identifier, angular position, and position in the sensor array.

In most cases, the LIDAR image includes fewer pixels than any given color image and thus it is often the case that more than one color pixel can correspond to a LIDAR pixel. In cases such as this, the color-pixel lookup table can store identifying data for a group of color pixels whose values can be combined (e.g. averaged) and then associated with a single LIDAR pixel. Other methods of combination can be used such as max value, min value, mode, etc.

B. Runtime Pixel Mapping Method

Figure 8:
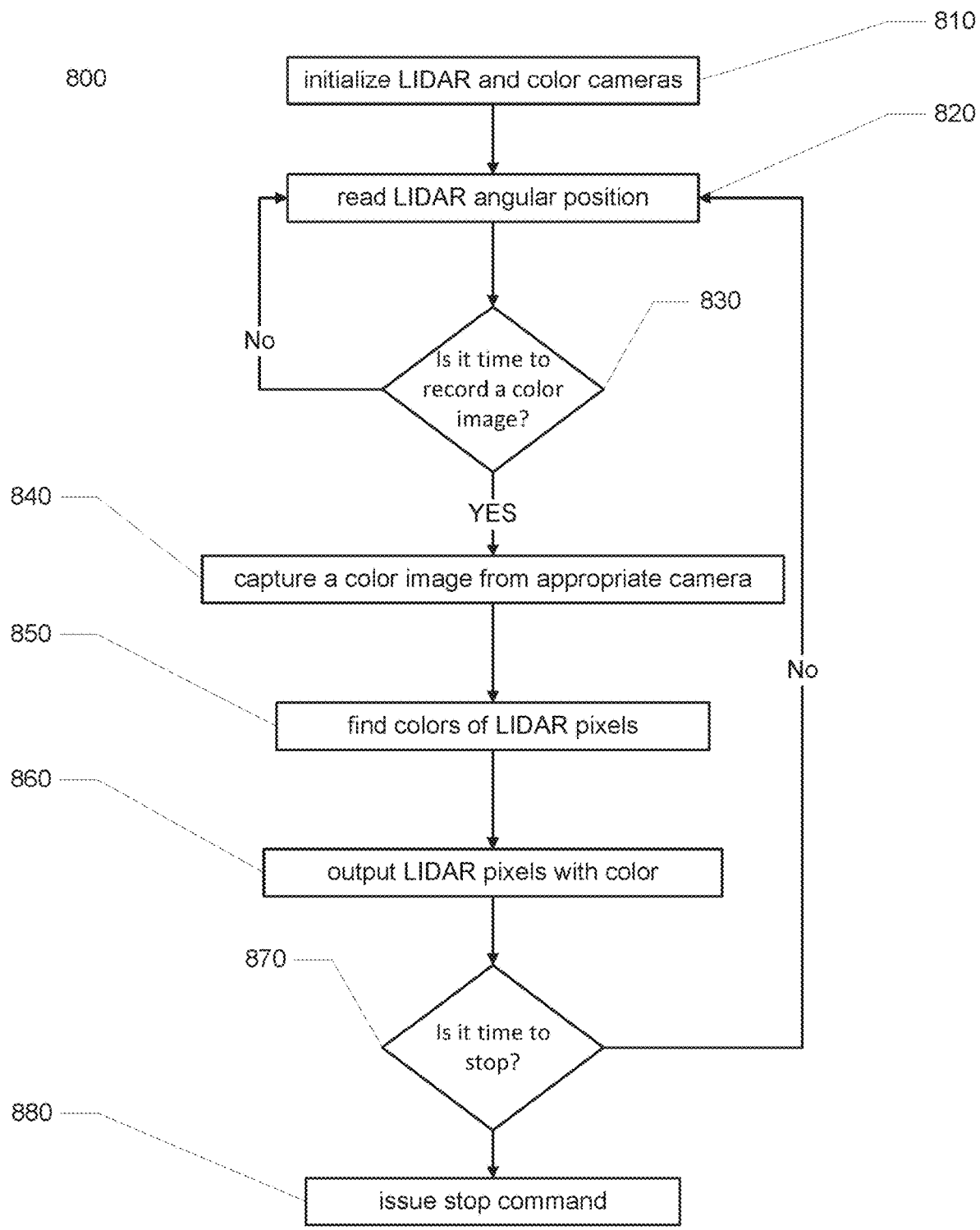
FIG. 8 is flow-chart showing the steps for augmenting a 360 panoramic-view LIDAR system with color.

FIG. 8 illustrates flow-chart showing a method 800 for augmenting a 360 degree panoramic-view, LIDAR system with color. Method 800 can be used to determine color information for each acquired LIDAR pixel using a stored color-pixel lookup table according to certain embodiments. The PCLS can already be calibrated, and thus store a lookup table for mapping LIDAR pixels to color pixels.

In step 810, the PCLS initializes the LIDAR system and the color cameras. The PCLS can set or read operational parameters of the LIDAR system such as rotational speed, resolution of images, which table(s) to load into memory, etc. The PCLS can then start spinning and capturing LIDAR data. The PCLS can initialize operational parameters of each of the color cameras.

In step 820, the PCLS determines the pointing direction of the LIDAR system at a given instant in time. The PCLS can square a LIDAR pixel as part of a ranging measurement by transmitting light and detecting reflected light. As described above, a rotary encoder can provide an angular position signal to a system controller, which can determine the angular position of the LIDAR system based on the angular position signal. The PCLS can perform such a measurement at a rate that is equivalent to the number of encoded positions, or faster or slower.

In step 830, the PCLS checks if the determined angular position is pointing within the field-of-view of the next camera (i.e., next in the rotational direction after the last camera that was triggered to obtain a color image). If the determined direction is pointing within the field-of-view of the next camera, a color image can be recorded, e.g., based on a command signal sent from a system controller to the next camera to trigger taking the image. The state of being in the field-of-view of the next camera can be defined by a particular angular position. If the determined angular position is not pointing within the field-of-view of the next camera, the PCLS can loop back to step 820.

In step 840, a system controller of the PCLS commands the appropriate camera to capture an image. For example, the system controller can provide an acquisition trigger signal directly to the camera. Upon reception of the trigger signal, the camera shutter is triggered and an acquisition begins. Accordingly, the system controller can trigger an image capture of each of the plurality color images when the controller determines that the angular position of the LIDAR is within a respective camera field of view.

In step 850, the PCLS determines the colors of LIDAR pixels using the color-pixel lookup table and one of several procedures. The choice of procedure can depend on multiple factors including: a) the FOV size of the LIDAR pixel versus the FOV size of the color pixel; b) the desired accuracy; c) the computational resources available; and d) the system cost. The PCLS can select a color pixel location using both the LIDAR pixel location and the viewed object distance when compensating for parallax differences between the camera and the LIDAR system. A system controller can make this determination.

Alternative procedures for determining the LIDAR pixel color include: (1) Selecting the color of the one color pixel that has the highest FOV overlap with the LIDAR pixel FOV. In this case, the color-pixel-lookup table indicates which color pixel to use; (2) Filtering or down-sampling the color camera image so its resolution matches or nearly matches that of the relevant portion of the LIDAR image. Selecting the color of the one pixel (within the filtered or down-sampled color image) which has the highest FOV overlap with the LIDAR pixel FOV; and (3) Averaging or applying a bi-linear filter to color components of the color pixels that have an overlap with the LIDAR pixel FOV.

In one embodiment where the LIDAR pixel FOV is larger than the color pixel FOV, the PCLS may augment the LIDAR pixel data with multiple color values corresponding to the color pixels that overlap the LIDAR pixel FOV. This extra level of color detail may be useful for object detection and recognition.

In step 860, the PCLS outputs the LIDAR pixel data augmented with color information. In one embodiment, the PCLS outputs the color-augmented LIDAR pixel data immediately after the PCLS has determined the LIDAR pixel color. Other embodiments may output batches of data. The PCLS may output the color-augmented LIDAR pixel data to a local device, e.g., user interface hardware 715 of FIG. 7.

In step 870 the PCLS decides whether to stop. For example, the user interface may issue a stop command or an error may require the PCLS to stop. If the PCLS needs to stop, the devices are shut down and method 800 can exit. If the PCLS does not need to stop, method 800 can continue back to step 820 to perform more measurements of angular positions of the LIDAR system.

The LIDAR pixels that are colorized in step 850 can correspond to LIDAR pixels that have not been mapped to a color image yet, as well as LIDAR pixels that are acquired after the color image is captured in step 840 but that map to that color image. The LIDAR pixels that correspond to a color image not taken yet can be stored in memory and then colorized once the image of the corresponding camera has been triggered. The determination of whether the corresponding color image exists can be performed in various ways, e.g., identifying whether the corresponding memory location includes any data or by a flag that indicates to store new LIDAR pixels until a next color image is taken. Further details of such procedures are discussed in the following flowchart.

Figure 9:
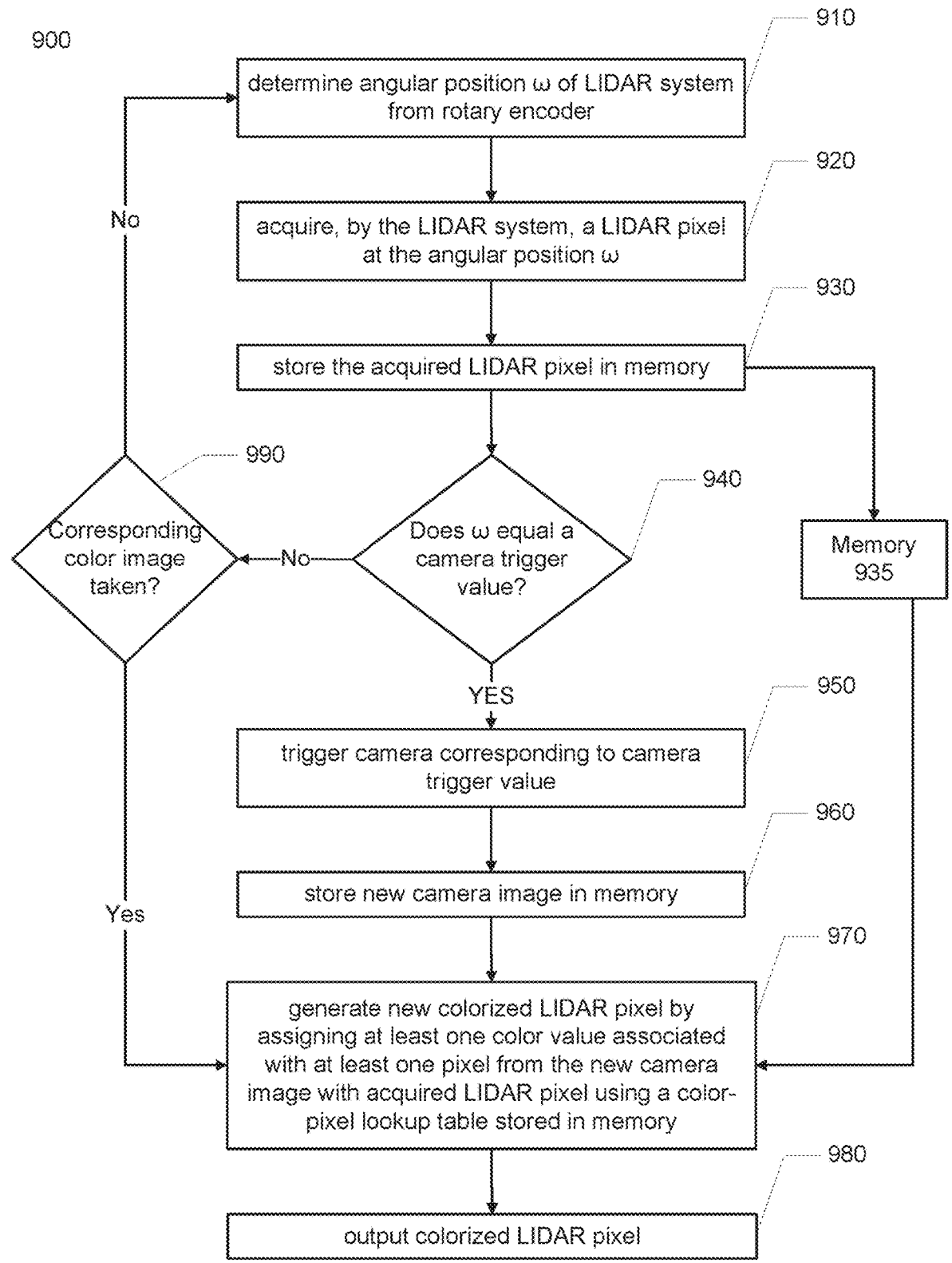
FIG. 9 is flow-chart showing the steps for augmenting a 360 panoramic-view LIDAR system with color.

FIG. 9 illustrates flow-chart showing a method 900 for augmenting a 360 degree panoramic-view, LIDAR system with color. Method 900 can be used to determine color information for each acquired LIDAR pixel using a stored color-pixel lookup table according to certain embodiments. The LIDAR pixel can be acquired along a direction that is within a field of view of a camera, but the camera has not yet acquired an updated color image corresponding to the current full rotation of the LIDAR system. In this case, the LIDAR pixel could be colorized using the color image that was acquired during the LIDAR system's previous rotation but this runs a risk that the old image will be significantly stale, i.e., many objects in the field around the LIDAR may have moved since the last acquisition. Accordingly, method 900 can provide for a new color image acquisition to be triggered by each of the cameras in the camera array as the system controller detects that that the LIDAR system is about to or has entered the field of view of one of the cameras.

In step 910, the angular position $\omega$ of the LIDAR system is determined (e.g., read) from the rotary encoder. For example, as described above in reference to FIG. 3, the encoder receiver 319 can transmit an angular position signal 334 to LIDAR controller 321, indicating that the scanning LIDAR system is pointing at a particular angular position, e.g., 100 degrees.

In step 920, the LIDAR system acquires a LIDAR pixel in the $\omega$ direction (100 degrees in this example). In some embodiments, the LIDAR pixel can include data that represents the reflectivity and distance of a point (e.g., an object) in the field surrounding the LIDAR. Thus, the LIDAR pixel can represent a depth and reflected intensity for one field of view surrounding the LIDAR. While this example uses only a single LIDAR pixel, as noted above, for each angular position, a LIDAR system can acquire several LIDAR pixels simultaneously or in close succession (e.g., distributed along the z-axis as shown in FIG. 4).

In step 930, the acquired LIDAR pixel is stored in memory, e.g., to accessed later during the colorization process. The acquired LIDAR pixel can be stored in memory 935, e.g., to be retrieved later when a corresponding color image is captured.

In step 940, the system controller compares the determined angular position $\omega$ with a set of trigger angular positions, e.g., $\omega_1, \omega_2, \ldots, \omega_n$ with the index n being equal to the number of cameras in the array. The specified values for a trigger angular position (e.g., $\omega_1, \omega_2, \ldots, \omega_n$) can depend on a number of variables, including the current revolution rate of the LIDAR, the shutter speed (accumulation time) of the camera, the size of each camera's angular field of view. In various cases, the trigger (specified) value may occur just before (e.g., to account for processing delay) or at the mid-point of a camera's angular field of view, or even outside the angular field of view of a given camera to account for the non-zero accumulation time of a given camera.

Using FIG. 4 as an example, if the center of a second camera responsible for color image 407 is at 120 degrees, the trigger point for that camera may be predetermined to be 100 degrees). With the trigger being 100 degrees, the actual color image can be acquired when the LIDAR system is at 120 degrees by the time the camera is activated while the LIDAR system continues to rotate.

To determine the various camera's trigger points, a calibration process can be performed for a number of different LIDAR rotation rates and shutter speeds. For example, the trigger points can be chosen to ensure that the color image for any given camera has completed by the time the LIDAR system is pointing midway through the angular field of view for any given camera. This can ensure that the LIDAR pixels closest to the center of the color image will be most closely synchronized in time to the color pixels of that image. Likewise, the LIDAR pixels that are earlier in the rotation, e.g., between 70 and 120 degrees will have been acquired slightly before the color camera acquisition and the LIDAR pixels that are later in the rotation, e.g., between 120 and 170 degrees will have been acquired slightly after the color camera acquisition.

In step 950, if the system controller determines that the angular position signal indicates that $\omega$ is equal to $\omega_1, \omega_2, \ldots,$ or $\omega_n$, the system controller can then generate a trigger command that is sent to the appropriate camera. In various embodiments, the trigger command can be sent via a camera controller, or sent directly from the system controller to the camera, to trigger an acquisition of the appropriate color camera of the array of color cameras. Such sequential triggering of the cameras based on predetermined position values can provide sequential acquisition of the color images for a given revolution of the LIDAR system.

In step 960, the new color camera acquisition is stored in memory, e.g., within flash memory that is located on one of the cameras or within system memory that is accessible to both the system controller and the camera. In some embodiments, color images of different revolutions of the LIDAR system can be stored in alternating memory (e.g., between 2, 3, etc. memory banks), as may depend on the processing time of colorizing the LIDAR pixels. Further, each camera can store a color image in a designated memory bank for that camera. In other embodiments, a next camera can append its color image to that of the previous color image in a single memory bank, where a start and end of a color images can be stored, e.g., as known by the size of the color images.

In step 970, the system controller can then generate a colorized LIDAR pixel from the stored LIDAR pixel by assigning at least one color value(s) to the LIDAR pixel. The color value(s) will be associated with at least one pixel from the new color camera acquisition that was triggered as a result of the above steps. For instance, the color value(s) might be obtained from a group of color pixels that are close to the LIDAR pixel.

As described in FIGS. 4, 5, and 7, the mapping between color and LIDAR pixels can be previously determined at the factory and stored in memory in the form of a color-pixel lookup table. Accordingly, the system controller can use the color-pixel lookup table to select one or more color value(s) from the appropriate color pixels to be used to colorize the LIDAR pixel. If more than one pixel is chosen, the color values can be combined, e.g., averaged to generate a single average color value. As used herein the term "color value" include a set of numbers, e.g., RGB values or any other values used in any other color space.

In step 980, the colorized LIDAR value is output from the system controller, e.g., to a user interface such as a display or to another module for further processing, such as object detection and the like.

Returning back to step 940, if the system controller determines that the angular position signal indicates that $\omega$ is not equal to $\omega_1, \omega_2, \ldots,$ or $\omega_n$, method 900 can proceed to step 990.

In step 990, it can be determined whether a corresponding color image has been taken. The LIDAR pixel may correspond to an untaken color image of a camera when the LIDAR pixel is acquired at an angular position in a first half of the field of view of that camera. For example, if the angular position is 90 degrees and the trigger angle is 120 degrees for that camera, the corresponding color image has not been taken. In such a case, the LIDAR pixel is stored in memory 935 for later use at step 970. Thus, when step 970 after acquiring a color image at a trigger position, pixels stored in memory 935 for that color image can be retrieved and colorized in step 970. Accordingly, some embodiments can store a group of LIDAR pixels in the memory until a corresponding color image of the plurality of color images is acquired, and then assign one or more of the plurality of color pixels to each of the group of the plurality of LIDAR pixels in response to the corresponding color image being acquired.

If the color image has already been taken, method 900 can proceed to step 970. The newly acquired LIDAR pixel can be colorized with the most recent color image acquired, e.g., using a lookup table.

VII. Additional Details of Example System

In general, the PCLS can employ any type of scanning LIDAR without departing from the scope of the present disclosure. For example, the LIDAR can include pairs (e.g., 32 pairs, 64 pairs, 128 pairs, etc.) of laser emitters and photo diode detectors located within an upper housing that is rotationally coupled to a base unit that can include an array of color cameras located circumferentially about the base as described above in reference to FIG. 3. In some embodiments, each emitter and detector can be mounted to its own separate board with the emitter boards and detector boards mounted in two separate assemblies. The separate assemblies can be are positioned within the upper housing at different angles relative to the horizontal to provide different vertical fields of view. In some embodiments, the base can includes an electric motor that is connected to a rotary coupling that allows the motor the upper housing, thereby enabling the LIDAR system to capture a full 360 degree horizontal field of view.

Figure 10A:
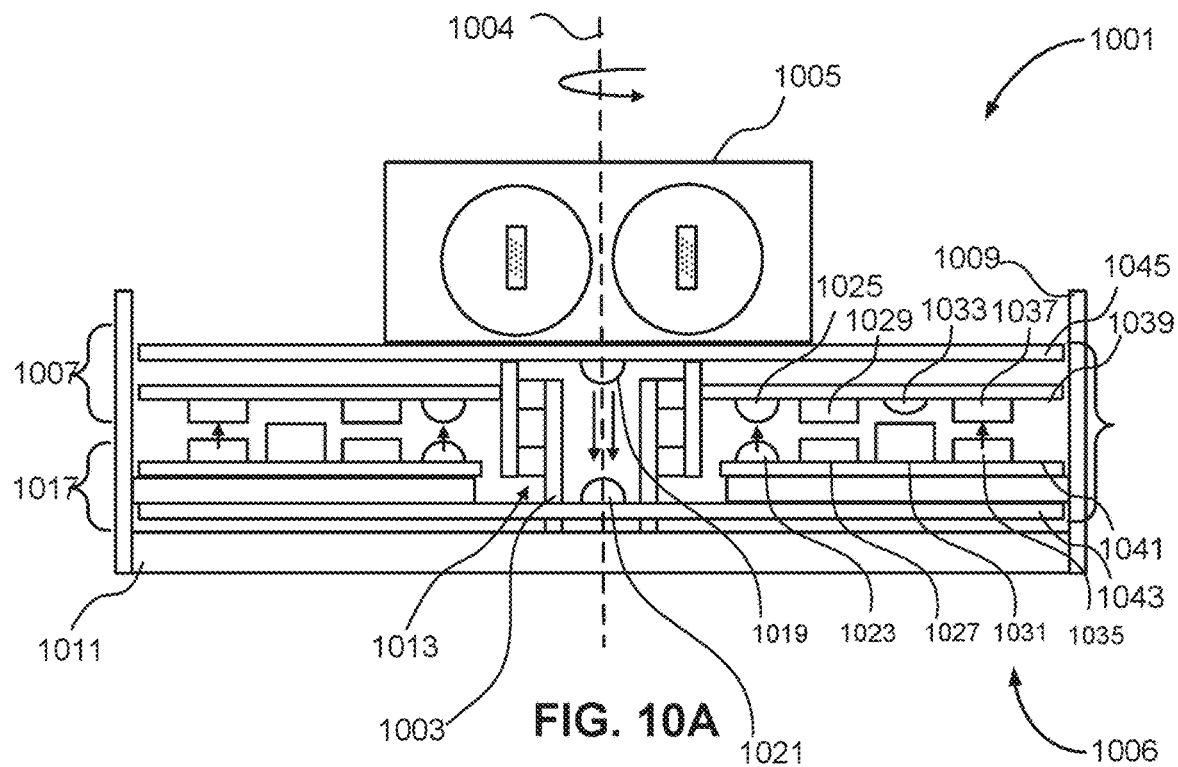
FIGS. 10A-10C show cross-sectional views of a LIDAR system in accordance with one or more embodiments.
Figure 10B:
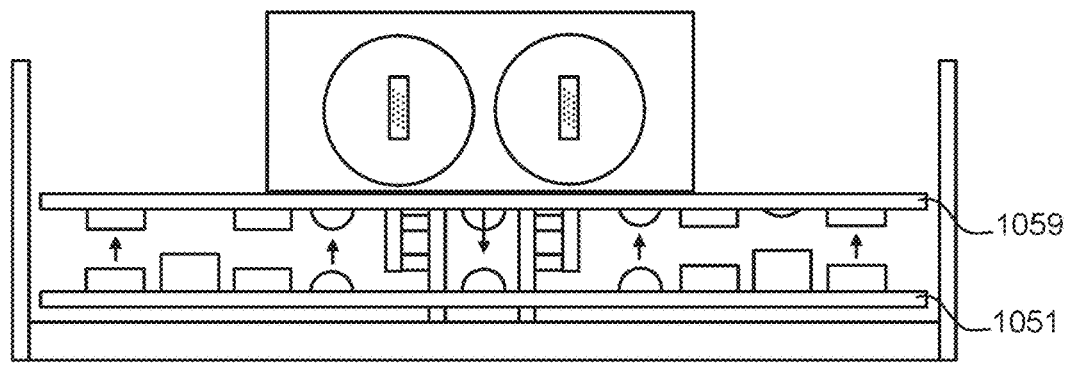
Figure 10C:
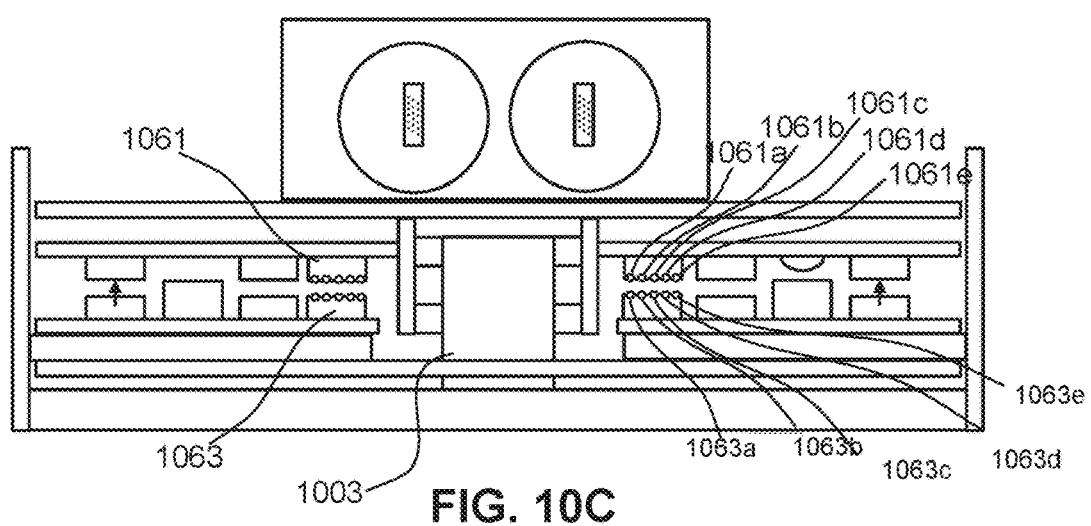
Figure 10D:
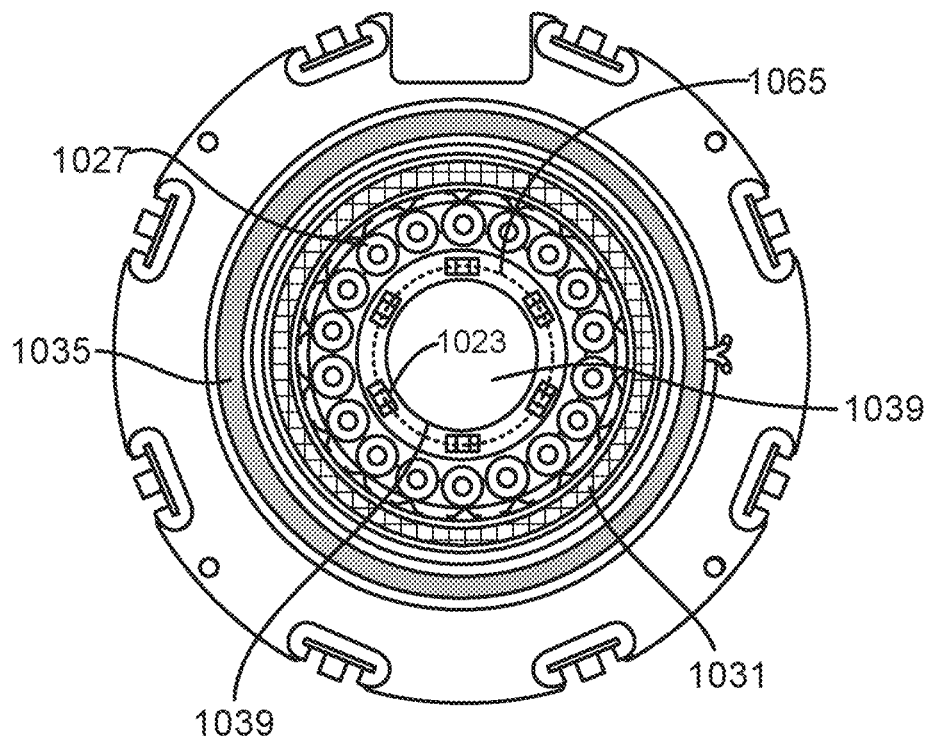
FIGS. 10D-10E provide views of surfaces of the individual circuit boards according to some embodiments.
Figure 10E:
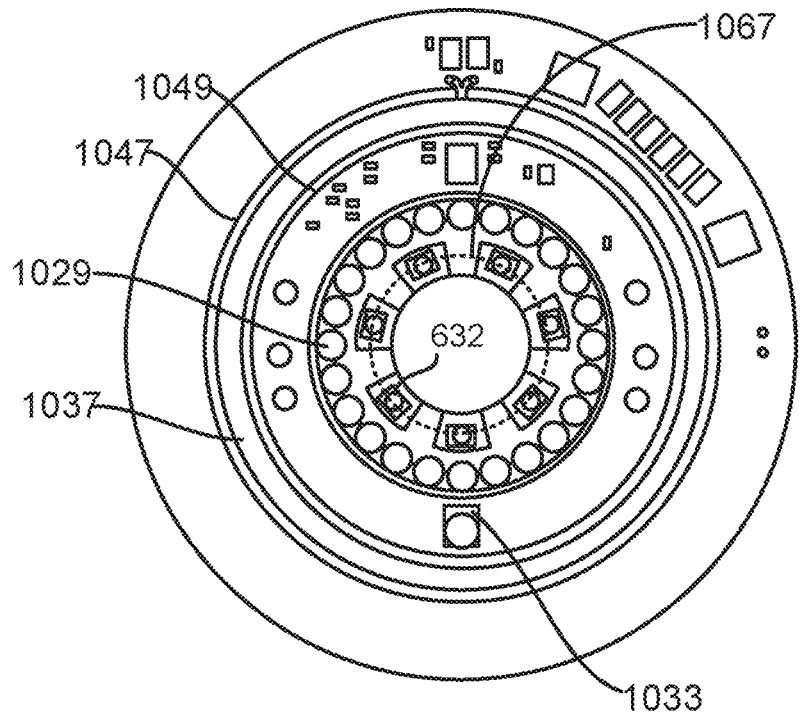

FIGS. 10A-10C show cross-sectional views of a LIDAR system 1001 in accordance with one or more embodiments. More specifically, the individual components shown in FIGS. 10A-10C correspond to those already described above in reference to FIG. 2-3, with the views shown FIGS. 10A-10C providing examples of the geometric placement of the various circuit elements according to some embodiments. FIG. 10A-10B show an embodiment that employs all optical communication between the upper and lower circuit board assemblies, and FIG. 10C shows an embodiment that employs an inductive communication. FIGS. 10D-10E provide views of surfaces of the individual circuit boards according to some embodiments to further illustrate the concentric circumferential arrangement of a number of individual circuit elements.

As shown in FIG. 10A, the upper and lower circuit board assemblies 1007 and 1017, respectively, can include two or more stacked planar circuit boards. Alternatively, as shown in FIG. 10B, the upper and lower assemblies can be single circuit boards 1059 and 1051, respectively. This highly integrated, stacked board design provides for a system that has a greatly simplified assembly process in comparison to systems that employ numerous stand-alone modules for all of the different functional elements of the LIDAR system.

As can be seen in FIG. 10A, the rotating turret assembly of the LIDAR includes the upper circuit board assembly 1007 and the light ranging system 1005. The rotation is enabled by bearing system 1013 located on the hollow shaft 1003 (having a longitudinal axis 1004 that is also the axis of rotation about which each of the planar circuit boards rotate).

A. Optical Links

1. Integrated Central Optical Downlink

In some embodiments, the hollow shaft 1003 can serve not only as a central structural member that supports each of the board assemblies, but also serves as a housing for a downlink optical communications channel ("the downlink channel") for providing data, e.g., ranging and/or operational data, from the turret assembly to the control and processing circuitry located in the lower circuit board assembly 1017 (also referred to as the base system). The optical downlink channel can include optical downlink transmitter 1019 and optical downlink receiver 1021. The optical downlink transmitter 1019 can be attached, e.g., soldered, directly to a surface of a circuit board of upper circuit board assembly 1007 and can be positioned such that it can transmit light through a central hole or opening in the hollow shaft 1003. Likewise, the optical downlink receiver 1021 can be attached, e.g., soldered, directly to a surface of a circuit board of the lower circuit board assembly 1017. The optical downlink receiver 1021 can be positioned on the lower end of the shaft and aligned with the optical downlink transmitter 1019 such that it is able to detect the light that is transmitted from the optical downlink transmitter 1019.

2. Integrated Optical Uplink

An optical uplink channel is formed between a circumferential arrangement of optical uplink transmitters 1023 and a complementary circumferential arrangement of optical uplink receivers 1025. Advantageously, the wall of the hollow shaft 1003 provides for optical isolation between the uplink and downlink channels and therefore minimizes crosstalk. The individual emitter and receivers of the circumferential arrangements are wired together such that they act together as a single composite receiver and a single composite transmitter. For example, as the system rotates the overall optical intensity up the uplink signal detected by the full arrangement of optical uplink receivers varies only slightly as the individual emitters/detectors pass each other. Furthermore, the number of individual transmitters can be the same as or different from the number of individual receivers.

The optical transmitters and receivers used for the optical uplink of the rotary actuator can be any type of optical emitter or detector. For example IR LEDs, laser diodes, VCSELs, and the like can be used for the emitters. Likewise any type of light detection technology can be used for the receivers, e.g., photodiodes and the like. In addition, the optical transmitters and receivers used for the optical uplink can be the same or different type (e.g., power and wavelength) as those used for the downlink.

An example of a circumferential arrangement of optical uplink transmitters 1023 is shown in FIG. 10D, which illustrates a top view of a circuit board, e.g., circuit board 1041 of FIG. 10A or circuit board 1051 of FIG. 10B. In this example, there are 6 optical uplink transmitters 1023 that are circumferentially arranged around the central hole 1069. The 6 transmitters are evenly spaced around the circle 1065 whose center is located at center of the shaft (not shown) and therefore overlapped with the axis of rotation.

The opposing surface of the rotating board includes a corresponding circumferential arrangement of optical uplink receivers 1025, as shown in FIG. 10E, which illustrates a bottom view of a rotating circuit board, e.g., circuit board 1039 of FIG. 10A or circuit board 1051 of FIG. 10B according to some embodiments. In this example, there are 7 optical uplink receivers that are circumferentially arranged around the central hole 1071. The 7 receivers are evenly spaced around the circle 1067 whose center is located at center of the shaft (not shown) and therefore overlapped with the axis of rotation. Accordingly, as the board rotates, the arrangement of optical uplink receivers 1025 rotates about the axis of rotation. Because the radius of circle 1067 is same as the radius of circle 1065, the transmitters are aligned with the receivers and the rotation merely results in a slight rise and fall of the average signal over time with a frequency being a multiple of the rotation frequency of the turret system.

B. Inductive Communication Links

FIG. 10C shows an embodiment that employs an inductive communications system between the upper and lower circuit board assemblies. In this example, data uplink and downlink are provided by pairs of coils 1061a-e and 1063a-e respectively mounted on the lower circuit board assembly and upper circuit board assembly, as shown. The coils can include both data lines and clock lines. Each coil can be embedded within a separate channel, e.g., a circular channel, of a housing, such as upper coil housing 1061 and lower coil housing 1063 that are themselves mounted to the surfaces of their respective circuit boards. In some embodiments, there can be several coils that are used for multiple inductive data lines, e.g., downlink channel 1 transmitter coil 1061b and downlink channel 1 receiver coil 1063b, downlink channel 2 transmitter coil 1061c and downlink channel 2 receiver coil 1063c. In some embodiments, the downlink clock signal can be transmitted via a separate coil pair, e.g., downlink clock transmit coil 1061a and downlink clock receiver coil 1063a. Likewise, data uplink channels can be formed from one or more pairs of coils, e.g., by uplink transmitter coil 1063d and uplink receiver could 1061d. Like the downlink, the data uplink clock signal can also have a dedicated channel formed from a pair of coils, e.g., uplink clock transmitter coil 1063e and uplink clock receiver coil 1061e.

C. Integrated Electric Motor

According to certain embodiments, the electric motor for the rotary actuator is of a "pancake" or "axial" design having a planar rotor assembly on a rotor board that opposes a planar stator assembly on an opposing stator board. The stator and rotor assemblies of the electric motor are also integrated onto the boards of the rotary actuator 1006, i.e., the elements of the electric motor are one of many components on the surface of the printed circuit boards and thus a separate motor module is not required for the LIDAR system. For example, the motor stator assembly 1027 can include a circular arrangement of stator elements, e.g., vertically oriented solenoids (having their longitudinal axes perpendicular to the surface of the board) that are affixed, e.g., using an adhesive, to a board of the lower circuit board assembly 1017 or to a soft magnetic core that is then affixed to the lower circuit board assembly 1017. Examples of the solenoid windings are shown in the top view of FIG. 10D. Each solenoid coil can be wound around a core of magnetic material, e.g., ferrite or the like. The coils are oriented such that the magnetic field exiting the solenoid is substantially oriented in a direction that is substantially perpendicular to the plane of the circuit board.

Positioned above the motor stator assembly 1027 and attached to a board of the upper circuit board assembly 1007 is the motor rotor assembly 1029. In some embodiments, the motor rotor assembly can be a passive element that includes a circular arrangement of permanent magnets, with their poles arranged in an alternating pattern to sequentially oppose and attract the opening of the various solenoid coils of the stator assembly, as shown in more detail in board view shown in FIG. 10E. As can be seen in FIGS. 10D and 10E, the motor stator assembly 1027 and the motor rotor assembly 1029 can have an overall circular ring shape with both stator and rotor circles having the same radius and center positions (e.g., both rings can be centered on the shaft).

D. Integrated Wireless Power Transmission System

To provide power to the circuit elements connected to the rotating upper circuit board assembly 1007, the rotary actuator 1006 includes a wireless power system, also referred to herein as a rotary transformer, including a wireless power transmission subsystem including a wireless power transmitter 1035 and a wireless power receiving subsystem including a wireless power receiver 1037. The wireless power transmitter 1035 can be a transmitter coil in the form of a circular loop antenna, i.e. a single turn or multi-turn coil, that is attached to a surface of a circuit board of the lower circuit board assembly 1017, e.g., as shown in FIG. 10D. Likewise, the wireless power receiver 1037 can be a receiver coil in the form of a circular loop antenna, i.e. a single turn or multi-turn coil, that is attached to a surface of a circuit board of the upper circuit board assembly 1017, e.g., as shown in FIG. 10E. The centers of both the wireless power transmitter 1035 and the wireless power receiver 1037 are positioned at the center of the hollow shaft 1003 and are therefore concentric with, the optical encoder ring, the electric motor assemblies, and the optical uplink receiver/transmitters.

In some embodiments, the wireless power transmitter 1035 and a wireless power receiver 1037 can be placed within an annular region of their respective boards with the walls and bottom of the annular regions formed from a magnetic material, e.g., ferrite or the like. For example, FIG. 10E shows wireless power receiver 1037 disposed within an annular region formed from ferrite walls 1047 and 1049 and occluded ferrite bottom. Such an arrangement of ferrite materials helps channel the magnetic fields between the transmitter and receiver to improve power transfer efficiency and reduce electromagnetic radiation leaking from the system.

E. Integrated Optical Encoder

The rotary actuator 1006 further includes an integrated optical encoder assembly that allows for readout of the angular position of the upper circuit board assembly 1007 relative to the lower circuit board assembly 1017. The optical encoder assembly includes a patterned annular optical encoder 1031 and rotary encoder detector 1033 for reading off the angular position of the assembly by, e.g., detecting and counting the number of patterns that pass the rotary encoder detector 1031 as the system rotates. In certain embodiments, the rotary encoder detector 1033 can include an illumination device, such as an LED and a detector, such as a photodiode or imaging detector for illuminating and detecting the patterned surface of the annular optical encoder. In some embodiments, the annular optical encoder can include a start code that occurs at a unique position on the annulus or provides absolute encoding patterns thereby enabling an absolute angular orientation measurement. In some embodiments, the encoder system is magnetic instead of optical in nature and relies on a similarly positioned magnetic encoder strip and magnetic encoder reader.

In some embodiments, the annular optical encoder 1031 can be attached to a surface of a circuit board of the lower circuit board assembly 1017 and the rotary encoder detector 1033 can be attached to a surface of the upper circuit board assembly 1007 as shown here, or vice versa. Regardless of which board it is placed on, the annular optical encoder 1031 can be arranged to have its center at the center of the hollow shaft 1003 and is therefore concentric with both the electric motor assemblies and the optical uplink receiver/transmitters, e.g., as shown in FIG. 10D. In some embodiments, the rotary encoder detector 1033 is positioned on the rotating circuit board, anywhere above the annular optical encoder 1031, e.g., as shown in FIG. 10E. Advantageously, the encoder assembly is positioned between the wireless power transmission system and the electric motor assembly to maximize the optical isolation between the encoder detector and the transmitters of the optical uplink system. As shown in the example of FIG. 10A, in some embodiments the annular optical encoder 1031 can be on the stator side of the rotary actuator 1006 while the rotary encoder detector 1033 on the rotor side. While this is a non-standard configuration for rotary actuators, this configuration is advantageous for a LIDAR application. For example, by removing the rotary connection between the rotary encoder detector 1033 and the light ranging system 1005 in this manner, the implementation of a low latency connection between the two systems can be implemented. In LIDAR applications a low latency connection can be important for quickly ingesting the angular position measurements of the rotary encoder detector 1033 and correlating the current ranging information with the current angular position of the rotor for increased spatial accuracy.

VIII. Alignment Using Time Stamps

In addition to triggering color images using angular positions of the LIDAR system, some embodiments can use a common internal clock to timestamp each LIDAR pixel and each camera pixel as it streams into the processor so that the data is on a common time base for tight temporal correlation. When a LIDAR pixel is received for colorization, its capture time can be used to select color pixel(s) that are nearby in time, e.g., within the closest in time or within a specified time threshold. For example, the selection can use a lookup table to identify coordinates of the color pixels, and these coordinate(s) can be used with the time stamp of the LIDAR pixel to select the particular pixel value(s) at these coordinate(s) with a desired time relative to a time stamp of the LIDAR pixel. A blending of color pixels at different times can also be performed.

Figure 11:
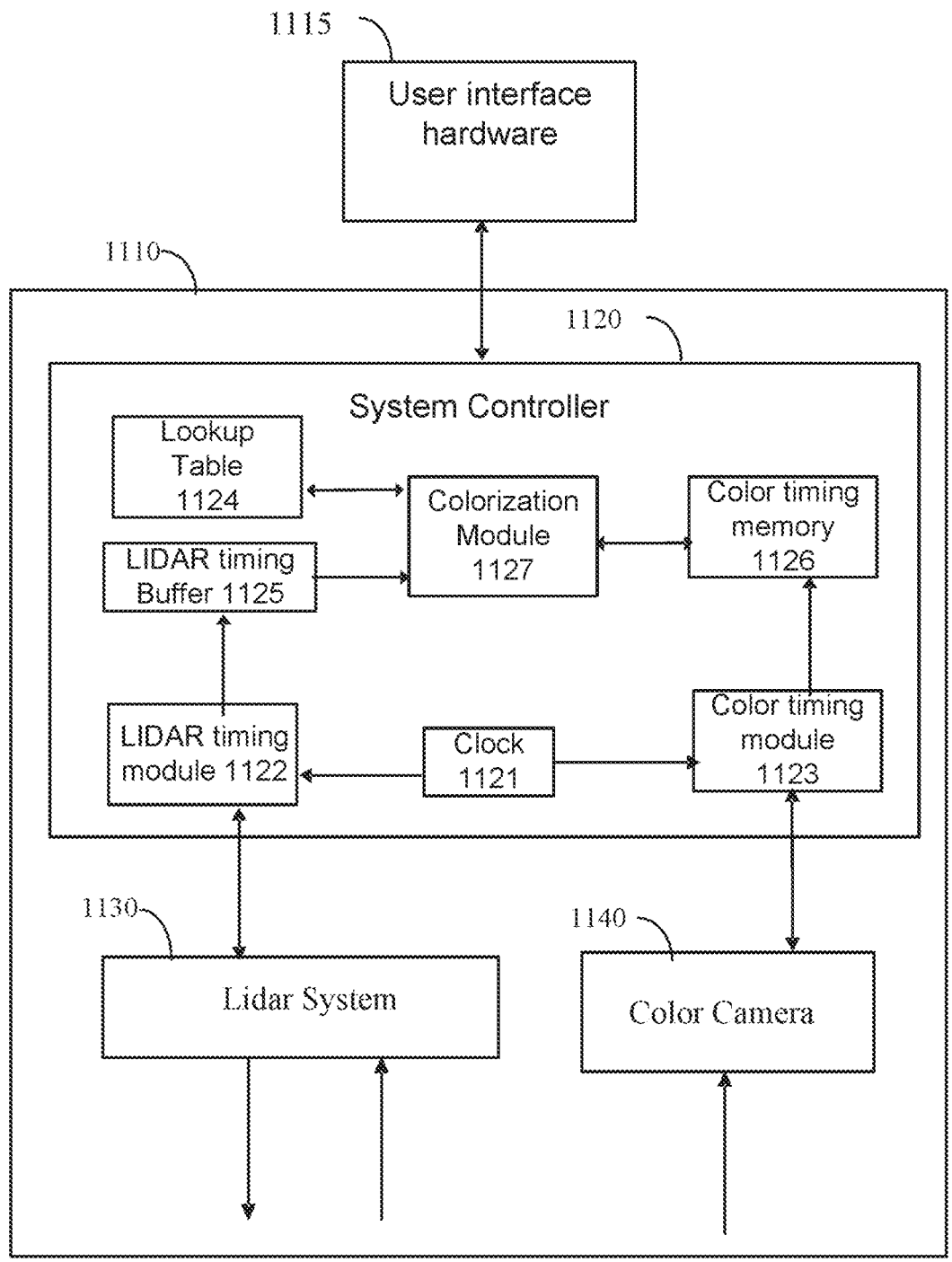
FIG. 11 shows a block diagram of a PCLS using time stamps of LIDAR and color pixels according to certain embodiments

FIG. 11 shows a block diagram of a PCLS 1110 using time stamps of LIDAR and color pixels according to certain embodiments. The PCLS 1110 can interact with user interface hardware 1115, in a similar manner as user interface hardware 715 of FIG. 7. PCLS 1110 includes a system controller 1120, a scanning LIDAR system 1130, and an array of color cameras 1140. PCLS 1110 can use a lookup table 1124 (e.g., 724 of FIG. 7).

Clock 1121 can provide a common internal clock signal to LIDAR timing module 1122 and to color timing module 1123. LIDAR timing module 1122 can assign a time stamp to each LIDAR pixel using the clock signal. If an array of LIDAR pixel sensors is used, each of the LIDAR pixels in the array can have the same time. In various embodiments, the time can be when the first LIDAR pixel, the last LIDAR pixel, or any other LIDAR pixel in the array is received by LIDAR timing module 1122. The LIDAR pixels along with their timing information can be stored in a LIDAR timing buffer 1125.

Color timing module 1123 assigns a timestamp to the color pixels. When a global shutter is used, the pixels of a given color image can all have a same time stamp. When a rolling shutter is used, the color pixels of a pixel image can have different time stamps, e.g., each corresponding to the particular time a color pixel was captured. Thus, embodiments can timestamp each pixel in the rolling shutter camera as it streams in. Further, color timing module 1123 can adjust the timestamps based on knowledge of the exposure time and/or data readout latency of each of the color cameras. Color timing memory 1126 can store color pixels from the cameras, and can store multiple pixel images from a given camera. For example, color cameras 1140 can operate at a higher frame rate than LIDAR system 1130. This higher rate can allow the system to select the color pixels that are relatively close in time, in addition to, or as an alternative to requiring triggering of color images based on angular position of the LIDAR system 1130. Thus, for a given revolution of the LIDAR system, multiple color images can be captured for each color camera, e.g., 2, 3, or more color images per camera for revolution of the LIDAR system.

When a LIDAR pixel is sent from LIDAR timing buffer 1125 (e.g., a FIFO buffer) to colorization module 1127, colorization module 1127 can identify the corresponding color pixel coordinate(s) using lookup table 1124. Then, colorization module 1127 can retrieve the color pixels from color timing memory 1126 corresponding to these coordinate(s) and having a timestamp closest to the timestamp of the LIDAR pixel. Color timing memory 1126 can store the data indexed by various fields to facilitate quick retrieval, e.g., time, color pixel coordinate, and camera ID.

Once the desired color pixel(s) are retrieved, colorization module 1127 can determine the colors to be used from the color pixel(s), e.g., as described herein. The colorized LIDAR pixels can then be output from PCLS 1110, e.g., to user interface hardware.

IX. Computer System

Any of the computer systems or circuits mentioned herein may utilize any suitable number of subsystems. The subsystems can be connected via a system bus. As examples, subsystems can include input/output (I/O) devices, system memory, storage device(s), and network adapter(s) (e.g. Ethernet, Wi-Fi, etc.), which can be used to connect a computer system other devices (e.g., an engine control until). System memory and/or storage device(s) may embody a computer readable medium.

A computer system can include a plurality of the same components or subsystems, e.g., connected together by external interface, by an internal interface, or via removable storage devices that can be connected and removed from one component to another component. In some embodiments, computer systems, subsystem, or apparatuses can communicate over a network.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

What is claimed is:

1. A panoramic color light detection and ranging (LIDAR) system comprising:
    a stationary base;
    a LIDAR system rotationally coupled to the stationary base and configured to perform a plurality of ranging measurements by transmitting light and detecting reflected light to acquire a LIDAR image including a plurality of LIDAR pixels distributed around an angular field of view;
    a plurality of color cameras fixedly coupled to the stationary base and disposed circumferentially around the LIDAR system, each camera having a respective camera field of view that is a portion of the angular field of view, the plurality of color cameras configured to acquire a plurality of color images comprising a plurality of color pixels;
    a memory storing a color-pixel lookup table that defines mappings between the plurality of LIDAR pixels and the plurality of color pixels;
    a controller operatively coupled to the memory and configured to:
        trigger an image capture of each of the plurality of color images based on a determined angular position of the LIDAR system relative to a respective camera field of view so as synchronize capturing of a portion of the LIDAR pixels with capturing of color pixels of a respective camera of the plurality of color cameras; and
        associate at least one of the plurality of color pixels of an identified one of the plurality of color images with a corresponding LIDAR pixel of the plurality of LIDAR pixels using the color-pixel lookup table stored in the memory, thereby generating a colorized LIDAR pixel.

2. The panoramic color LIDAR system of claim 1, further comprising:
a rotary encoder that is configured to output an angular position signal that corresponds to a pointing direction of the LIDAR system relative to a fixed reference point on the stationary base, wherein the controller is configured to receive the angular position signal and trigger the image capture when the angular position signal indicates that the angular position is equal to a specified value of the angular position signal associated with one of the plurality of color cameras.

3. The panoramic color LIDAR system of claim 1, wherein the controller is configured to:
store a group of the plurality of LIDAR pixels in the memory until a corresponding color image of the plurality of color images is acquired; and
associate one or more of the plurality of color pixels with each of the group of the plurality of LIDAR pixels in response to the corresponding color image being acquired.

4. The panoramic color LIDAR system of claim 1, further comprising:
an internal clock configured to record a plurality of time stamps;
the controller further configured to:
identify a first capture time for the at least one of the plurality of color pixels based on a first time stamp of the plurality of time stamps; and
identify a second capture time for the corresponding LIDAR pixel based on a second time stamp of the plurality of time stamps,
wherein associating the at least one of the plurality of color pixels with the corresponding LIDAR pixel is further based on comparing the first time stamp and the second time stamp.

5. The panoramic color LIDAR system of claim 1, further comprising:
an encoder receiver configured to determine the angular position by detecting a first feature corresponding to the determined angular position.

6. The panoramic color LIDAR system of claim 1, the controller further configured to:
output the colorized LIDAR pixel to a user interface.

7. A panoramic color light detection and ranging (LIDAR) system comprising:
a stationary base;
a LIDAR system rotationally coupled to the stationary base and configured to perform a plurality of ranging measurements by transmitting light and detecting reflected light to acquire a LIDAR image including a plurality of LIDAR pixels distributed around an angular field of view;
a plurality of color cameras fixedly coupled to the stationary base and disposed circumferentially around the LIDAR system, each camera having a respective camera field of view that is a portion of the angular field of view, the plurality of color cameras configured to acquire a plurality of color images comprising a plurality of color pixels; and
a controller configured for:
determining a spatial correspondence between respective ones of the LIDAR pixels and respective ones of the color pixels, wherein determining the spatial correspondence comprises using a color-pixel lookup table that defines mappings between the plurality of LIDAR pixels and the plurality of color pixels to associate the color pixels with the respective LIDAR pixels;
combining the color pixels with spatially corresponding LIDAR pixels to generate colorized LIDAR pixels; and
providing the colorized LIDAR pixels to a user interface.

8. The panoramic LIDAR system of claim 7, wherein the color-pixel lookup table is indexed by angular positions around 360 degrees for each revolution, wherein each entry of the color-pixel lookup table identifies one or more color pixels of a respective color image for a particular angular position and a particular sensor in a pixel array.

9. The panoramic LIDAR system of claim 7, wherein the color-pixel lookup table includes depth values for mapping between LIDAR pixels and the color pixels, the controller further configured for:
determining depth values of the LIDAR pixels, wherein the color pixels are further determined based on the depth values.

10. The panoramic LIDAR system of claim 7, wherein the colorized LIDAR pixels are provided via a three-dimensional color map of detected objects over time.

11. The panoramic LIDAR system of claim 10, wherein the color map further comprises a distance value at a particular time for a particular view for a specific object.

12. The panoramic LIDAR system of claim 7, wherein capturing the plurality of color images comprises:
capturing of each of the plurality of color images based on a determined angular position of the LIDAR system relative to a respective camera field of view so as synchronize capturing of a portion of the LIDAR pixels with capturing of color pixels of a respective camera of the plurality of color cameras.

13. A method comprising: performing, using a LIDAR system rotationally coupled to a stationary base, a plurality of ranging measurements by transmitting light and detecting reflected light to acquire a LIDAR image including a plurality of LIDAR pixels distributed around an angular field of view;
acquiring, using a plurality of cameras, a plurality of color images comprising a plurality of color pixels, each camera of the plurality of cameras having a respective camera field of view that is a portion of the angular field of view;
determining a spatial correspondence between respective ones of the LIDAR pixels and respective ones of the color pixels, wherein determining the spatial correspondence comprises using a color-pixel lookup table that defines mappings between the plurality of LIDAR pixels and the plurality of color pixels to associate the color pixels with the respective LIDAR pixels;
combining the color pixels with spatially corresponding LIDAR pixels to generate colorized LIDAR pixels; and
providing the colorized LIDAR pixels to a user interface.

14. The method of claim 13 wherein the color-pixel lookup table is indexed by angular positions around 360 degrees for each revolution, wherein each entry of the color-pixel lookup table identifies one or more color pixels of a respective color image for a particular angular position and a particular sensor in a pixel array.

15. The method of claim 13, wherein the color-pixel lookup table includes depth values for mapping between LIDAR pixels and the color pixels, the method further comprising:

determining depth values of the LIDAR pixels, wherein the color pixels are further determined based on the depth values.

16. The method of claim 13, wherein the colorized LIDAR pixels are provided via a three-dimensional color map of detected objects over time.

17. The method of claim 16, wherein the color map further comprises a distance value at a particular time for a particular view for a specific object.

18. The method of claim 13, wherein capturing the plurality of color images comprises:
capturing of each of the plurality of color images based on a determined angular position relative to a respective camera field of view so as synchronize capturing of a portion of the LIDAR pixels with capturing of color pixels.

* * * * *